(12) United States Patent
Hsu et al.

(10) Patent No.: US 10,619,278 B2
(45) Date of Patent: Apr. 14, 2020

(54) METHOD OF SEWING A FABRIC PIECE ONTO ANOTHER FABRIC PIECE BASED ON IMAGE DETECTION

(71) Applicant: ZENG HSING INDUSTRIAL CO., LTD., Taichung (TW)

(72) Inventors: Kun-Lung Hsu, Taichung (TW); Hsin-Hau Lin, Taichung (TW)

(73) Assignee: ZENG HSING INDUSTRIAL CO., LTD., Taichung (TW)

( * ) Notice: Subject to any disclaimer, the term of this patent is extended or adjusted under 35 U.S.C. 154(b) by 33 days.

(21) Appl. No.: 16/002,366

(22) Filed: Jun. 7, 2018

(65) Prior Publication Data

US 2019/0376219 A1    Dec. 12, 2019

(51) Int. Cl.
| | |
|---|---|
| *D05C 5/02* | (2006.01) |
| *G06T 7/13* | (2017.01) |
| *D05C 13/02* | (2006.01) |
| *D05B 19/12* | (2006.01) |
| *G06T 5/00* | (2006.01) |

(52) U.S. Cl.
CPC .............. *D05C 5/02* (2013.01); *D05B 19/12* (2013.01); *D05C 13/02* (2013.01); *G06T 5/002* (2013.01); *G06T 7/13* (2017.01); *D05D 2305/32* (2013.01)

(58) Field of Classification Search
CPC .......... D05C 5/02; D05C 13/02; D05B 19/08; D05B 19/10; D05B 19/12; D05B 2305/32; D05D 2305/32
See application file for complete search history.

(56) References Cited

U.S. PATENT DOCUMENTS

| 5,323,722 A * | 6/1994 | Goto ................... G05B 19/4205 |
| | | 112/102.5 |
| 2014/0083345 A1* | 3/2014 | Tokura .................... D05B 19/08 |
| | | 112/470.01 |
| 2017/0306541 A1* | 10/2017 | Kongo .................... D05B 19/08 |
| 2017/0316590 A1* | 11/2017 | Kongo ..................... D05C 3/02 |

* cited by examiner

*Primary Examiner* — Nathan E Durham
(74) *Attorney, Agent, or Firm* — Birch, Stewart, Kolasch & Birch, LLP

(57) ABSTRACT

A appliqué method includes: acquiring a first image of a first fabric piece; performing edge detection on the first image to acquire a plurality of edge points of the first fabric piece; calculating, for each of the edge points, coordinates of the edge point in a coordinate system corresponding to a computerized embroidery machine; and embroidering the first fabric piece onto a second fabric piece along an embroidering path formed by the coordinates of the edge points in the coordinate system.

11 Claims, 24 Drawing Sheets

METHOD OF SEWING A FABRIC PIECE ONTO ANOTHER FABRIC PIECE BASED ON IMAGE DETECTION

FIELD

The disclosure relates to a sewing method, and more particularly to a method of sewing a fabric piece onto another fabric piece based on image detection.

BACKGROUND

In a conventional appliqué method utilizing a computerized embroidery machine, a user selects a shape model (such as a circle, or an animal-like contour) which is pre-stored in the computerized embroidery machine and to which the shape of a to-be-sewn fabric piece has to conform, and operates the computerized embroidery machine to automatically sew the to-be-sewn fabric piece onto a base fabric along a line delineating the selected shape model using embroidery stitches (e.g., satin stitches).

For instance, as exemplified in part (a) of FIG. 1, the user selects a shape model 1 of a circle, and causes the computerized embroidery machine to automatically stitch a circle on a fabric 21 which is framed in an embroidery frame 23. Then, the user may remove the fabric 21 from the embroidery frame 23, cut the fabric 21 along the circular outline formed by the stitches to obtain a circular to-be-sewn fabric piece 10, attach the circular to-be-sewn fabric piece 10 onto a base fabric 22 that is framed in the embroidery frame 23, and cause the computerized embroidery machine to perform embroidery stitching along the contour of the circular to-be-sewn fabric piece 10, which is in the shape of the shape model 1.

SUMMARY

Therefore, an object of the disclosure is to provide an appliqué method that may enable a computerized embroidery machine to automatically sew a first fabric piece having an arbitrary contour onto a second fabric piece which is larger than the first fabric piece.

According to the disclosure, the appliqué method is implemented by a computerized embroidery system. The he appliqué method comprises: acquiring, by a camera apparatus of the computerized embroidery system, a first image of the first fabric piece, the first image corresponding to a first coordinate system, wherein the computerized embroidery system includes a computerized embroidery machine which has a second coordinate system; performing, by a computer device of the computerized embroidery system, edge detection on the first image to acquire a plurality of edge points of the first fabric piece in the first image; calculating for each of the edge points, by the computer device, coordinates of the edge point in the second coordinate system based on the first and second coordinate systems; and embroidering, by the computerized embroidery apparatus, the first fabric piece onto the second fabric piece along an embroidering path formed by the coordinates of the edge points in the second coordinate system.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
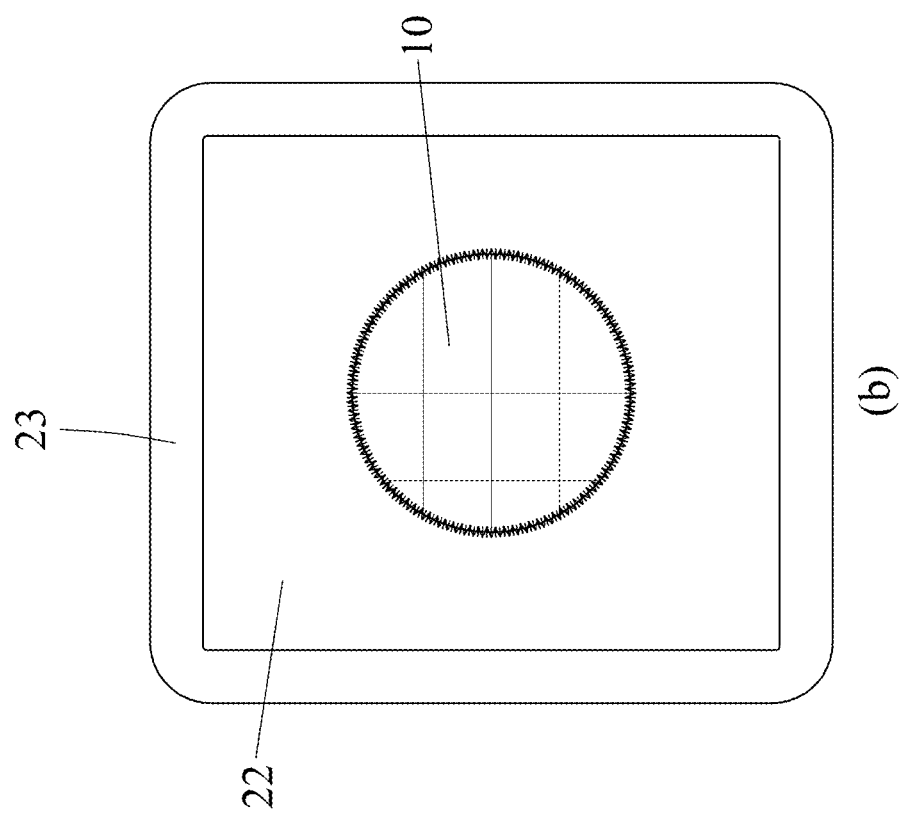
FIG. 1 is a schematic diagram illustrating a conventional appliqué method.
Figure 1:
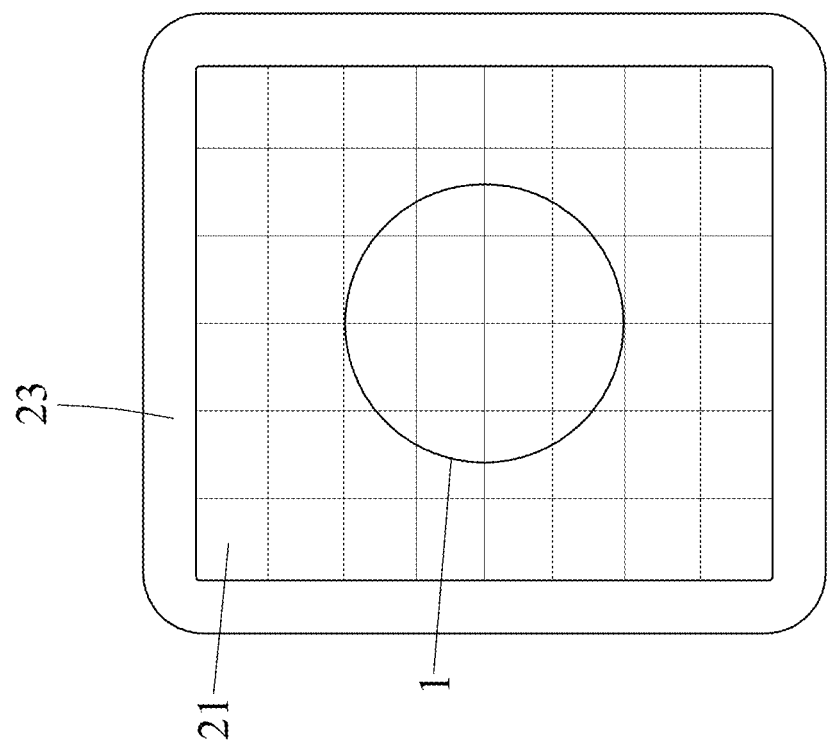

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
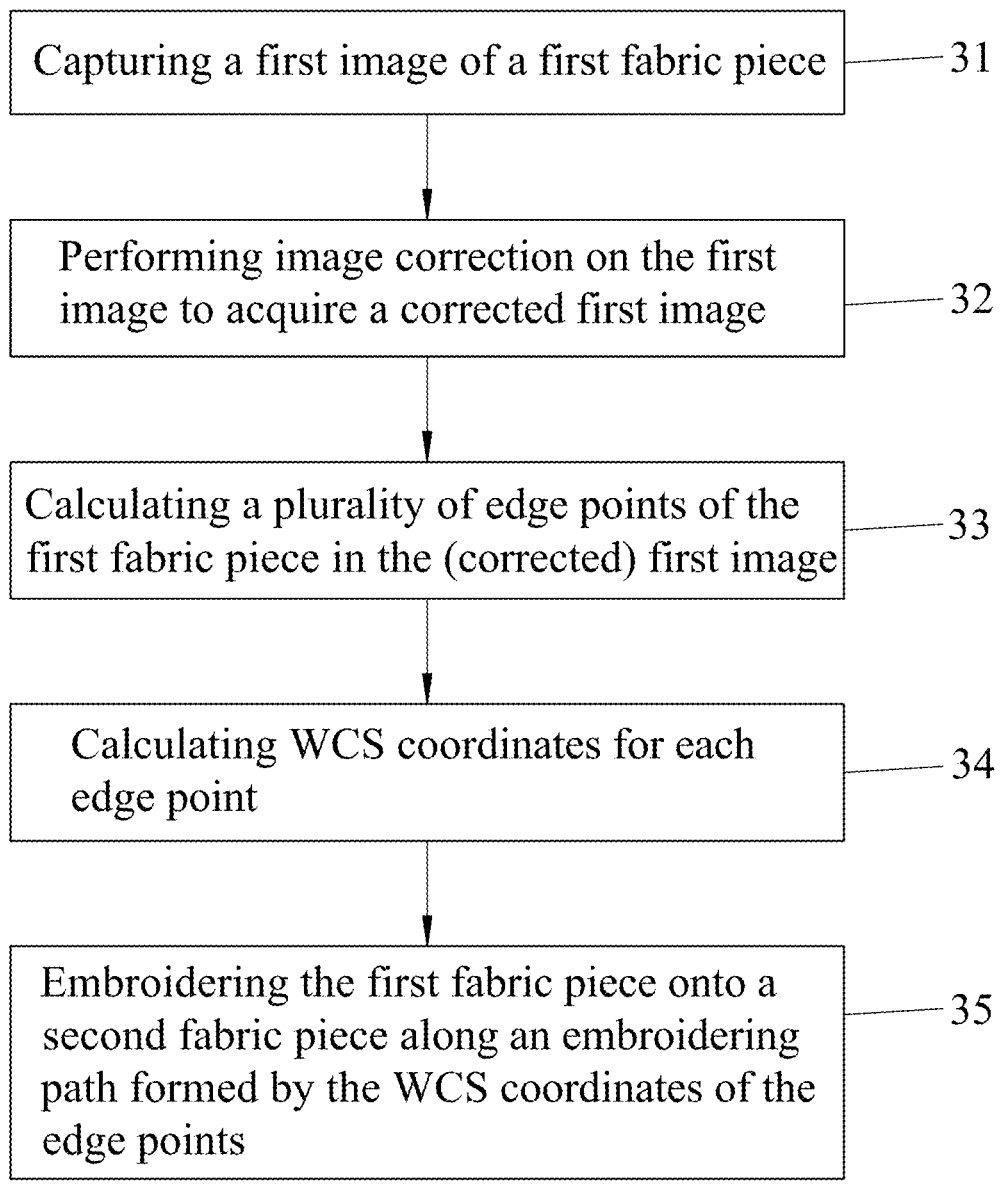
FIG. 2 is a flow chart illustrating steps of an embodiment of an appliqué method according to this disclosure.
Figure 4:
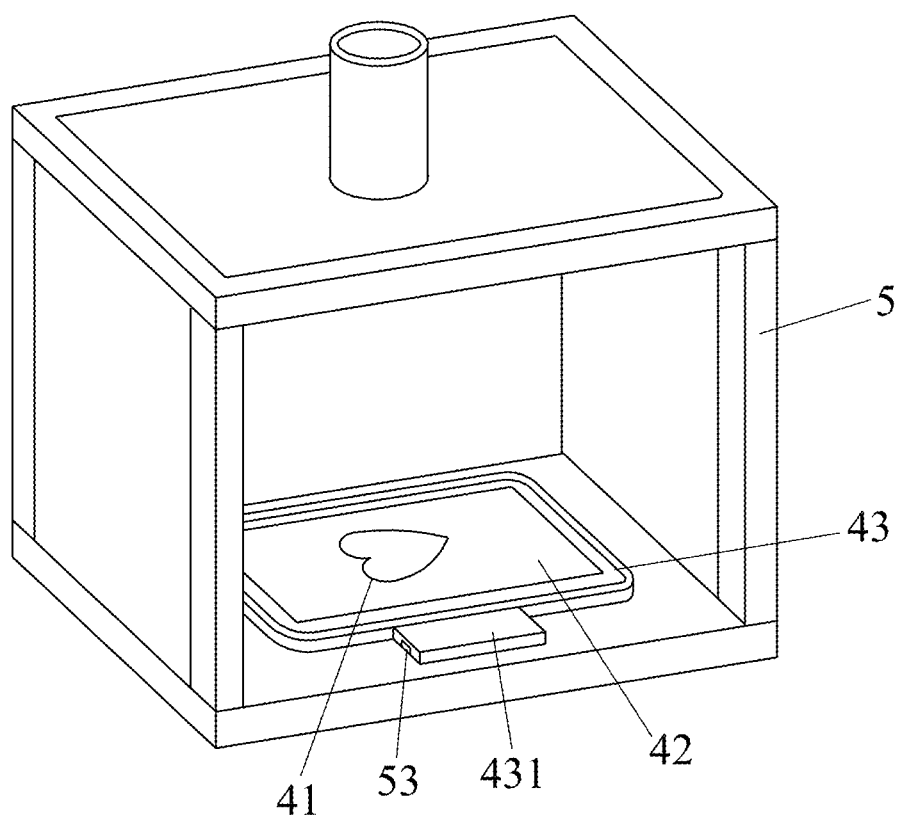
FIG. 4 is a perspective view illustrating the to-be-sewn fabric piece placed in a camera box for capturing a first image.
Figure 7:
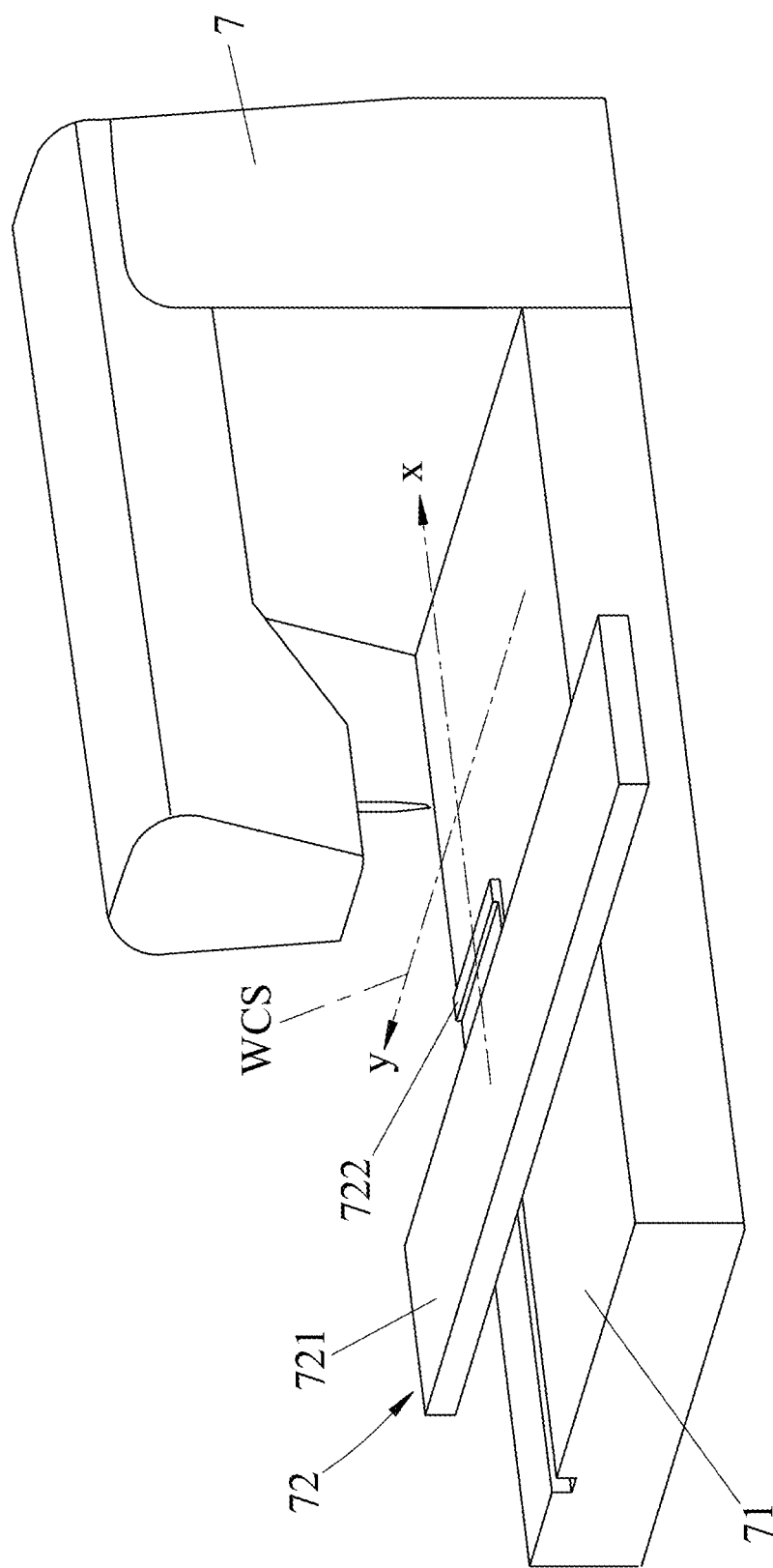
FIG. 7 is a perspective view illustrating a computerized embroidery machine.

Referring to FIGS. 2, 4 and 7, the embodiment of the appliqué method (sewing a decorating fabric piece onto a base fabric piece that is larger than the decorating fabric piece) is implemented by a computerized embroidery system. The computerized embroidery system includes a camera apparatus capable of image capturing, a computer device (not shown), and a computerized embroidery machine 7. The computer device may be, for example, a desktop computer, a notebook computer, or a tablet computer, etc. The camera apparatus in this embodiment is a camera box 5 having a camera lens, which may be a wide angle lens or a fisheye lens, but this disclosure is not limited in this respect. Description of other elements of a camera apparatus, such as an image sensor, is not provided herein for the sake of brevity.

Figure 3:
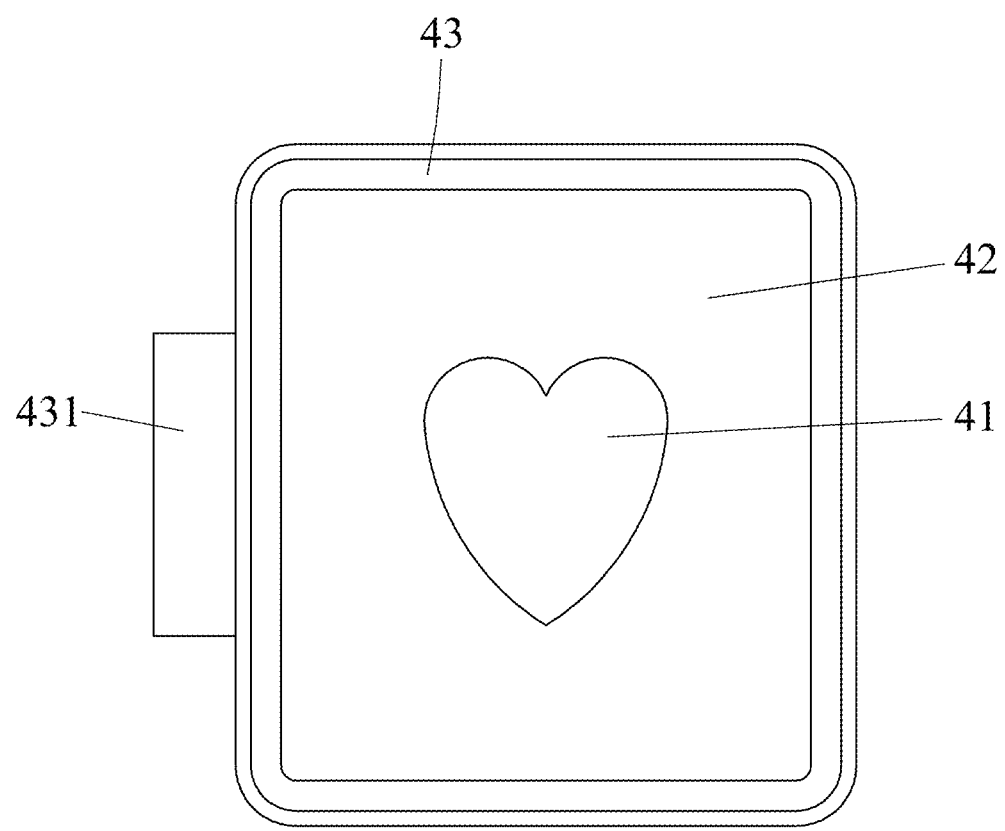
FIG. 3 is a schematic diagram illustrating a to-be-sewn fabric piece attached to a base fabric piece framed in an embroidery frame.

In step 31, a to-be-sewn fabric piece (first fabric piece 41) is attached to a base fabric piece (second fabric piece 42) which is framed in an embroidery frame 43, as shown in FIG. 3. The contour of the first fabric piece 41 may be of an arbitrary shape, and is a heart shape in this embodiment. The embroidery frame 43 is secured in the camera box 5 by engaging a first engaging structure 431 of the embroidery frame 43 with a second engaging structure 53 of the camera box 5, as shown in FIG. 4. The first and second engaging structures 431, 53 may be a matching mortise and tenon set, or may form a latch locking mechanism. The camera box 5 then captures a first image of the first fabric piece 41.

In step 32, the computer device may perform image correction on the first image for correcting distortion in the first image, to thereby acquire a corrected first image. One candidate algorithm of the image correction will be described hereinafter. However, if the first image captured by the camera box 5 only has slight distortion, the image correction may be omitted.

Figure 5:
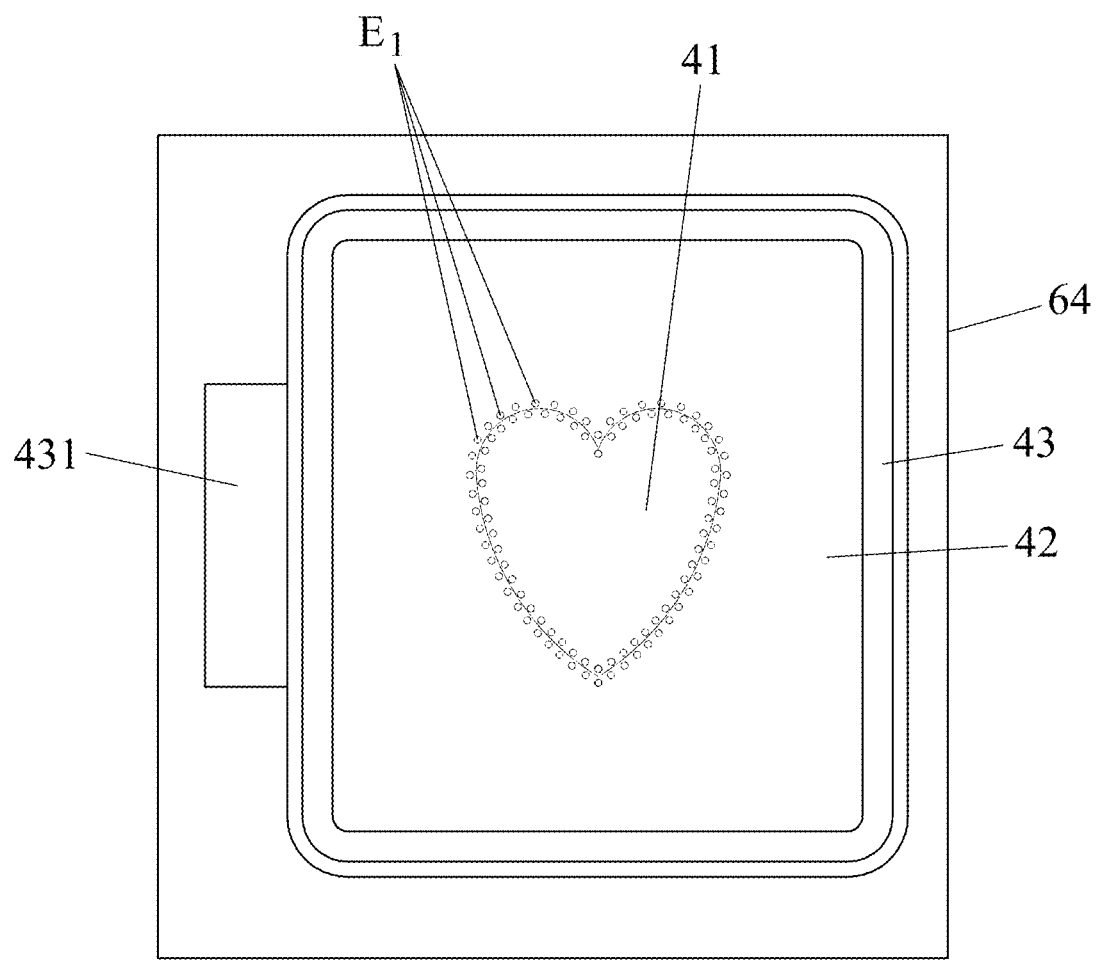
FIG. 5 is a schematic diagram illustrating a plurality of detected points at an edge of the to-be-sewn fabric piece in the first image.
Figure 6:
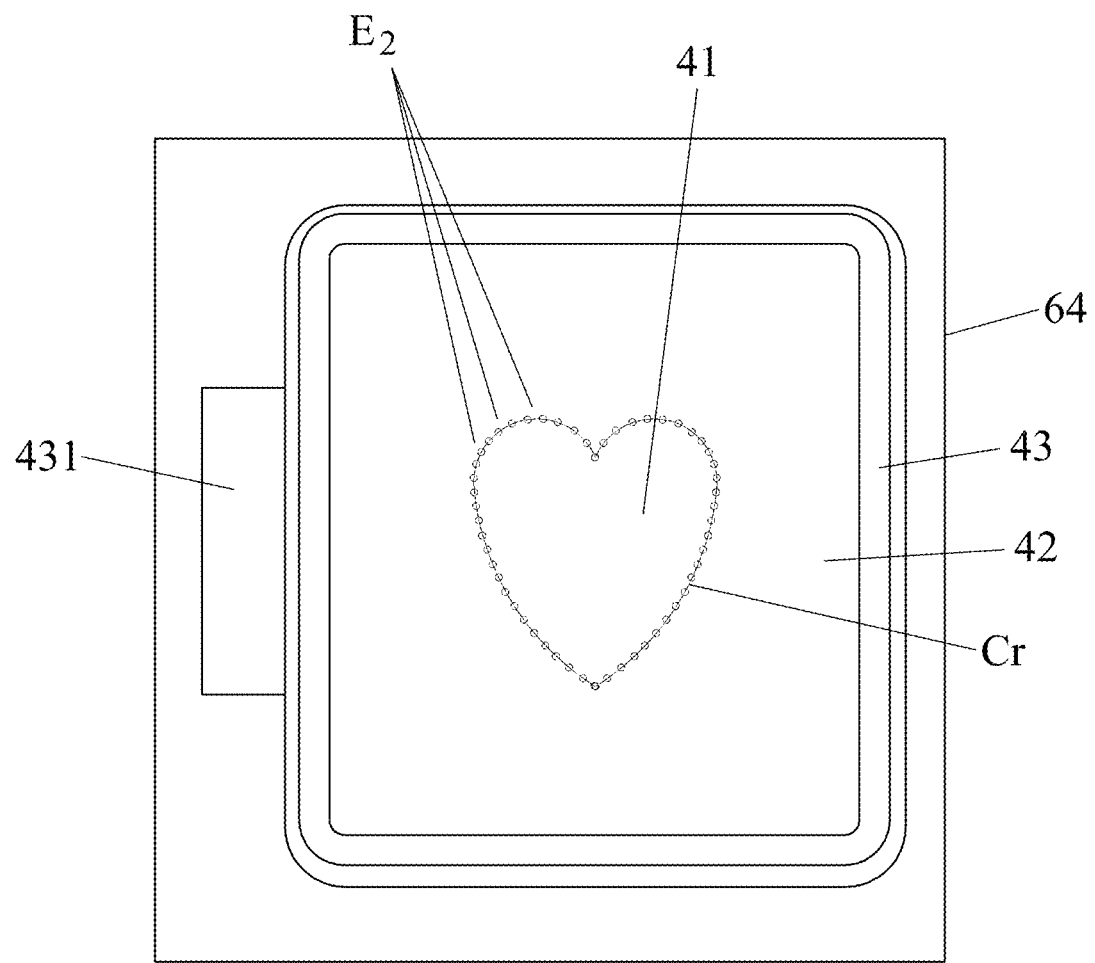
FIG. 6 is a schematic diagram illustrating a plurality of edge points obtained by performing smoothing operation based on the detected points.

In step 33, the computer device calculates a plurality of edge points of the first fabric piece 41 in the (corrected) first image. Referring to FIG. 5, the computer device performs edge detection on the corrected first image 64 to acquire a plurality of detected points ($E_1$) at an edge of the first fabric piece 41 therein using an edge detection algorithm, such as the Canny edge detector. Further referring to FIG. 6 the computer device may further perform a smoothing operation of the detected points ($E_1$) (see FIG. 5) to obtain a plurality of edge points ($E_2$) in some embodiments. In one implementation, the computer device may evaluate a parametric non-uniform rational B-splines (NURBS) curve (Cr) that fits the detected points ($E_1$), and sample the parametric NURBS curve (Cr) to obtain the edge points ($E_2$). However, if a curve formed by the detected points ($E_1$) does not appear apparently unsmooth, such as being jagged or burred, the smoothing operation may be omitted, and the detected points ($E_1$) may serve as the edge points ($E_2$) for subsequent operations. It is noted that the smoothing operation is not limited to the abovementioned method, and may be implemented using, for example, conventional smoothing filters.

In step 34, for each of the edge points ($E_2$), the computer device calculates, based on a world coordinate system (WCS) to which the computerized embroidery machine 7 (see FIG. 7) corresponds (i.e., the computerized embroidery machine 7 performs embroidery according to coordinates in the world coordinate system) and an image coordinate system (ICS) to which the (corrected) first image corresponds, coordinates of the edge point ($E_2$) in the WCS. The ICS is for example defined by the resolution of the camera box 5, or by pixels of any image captured by the camera box 5.

Figure 8:
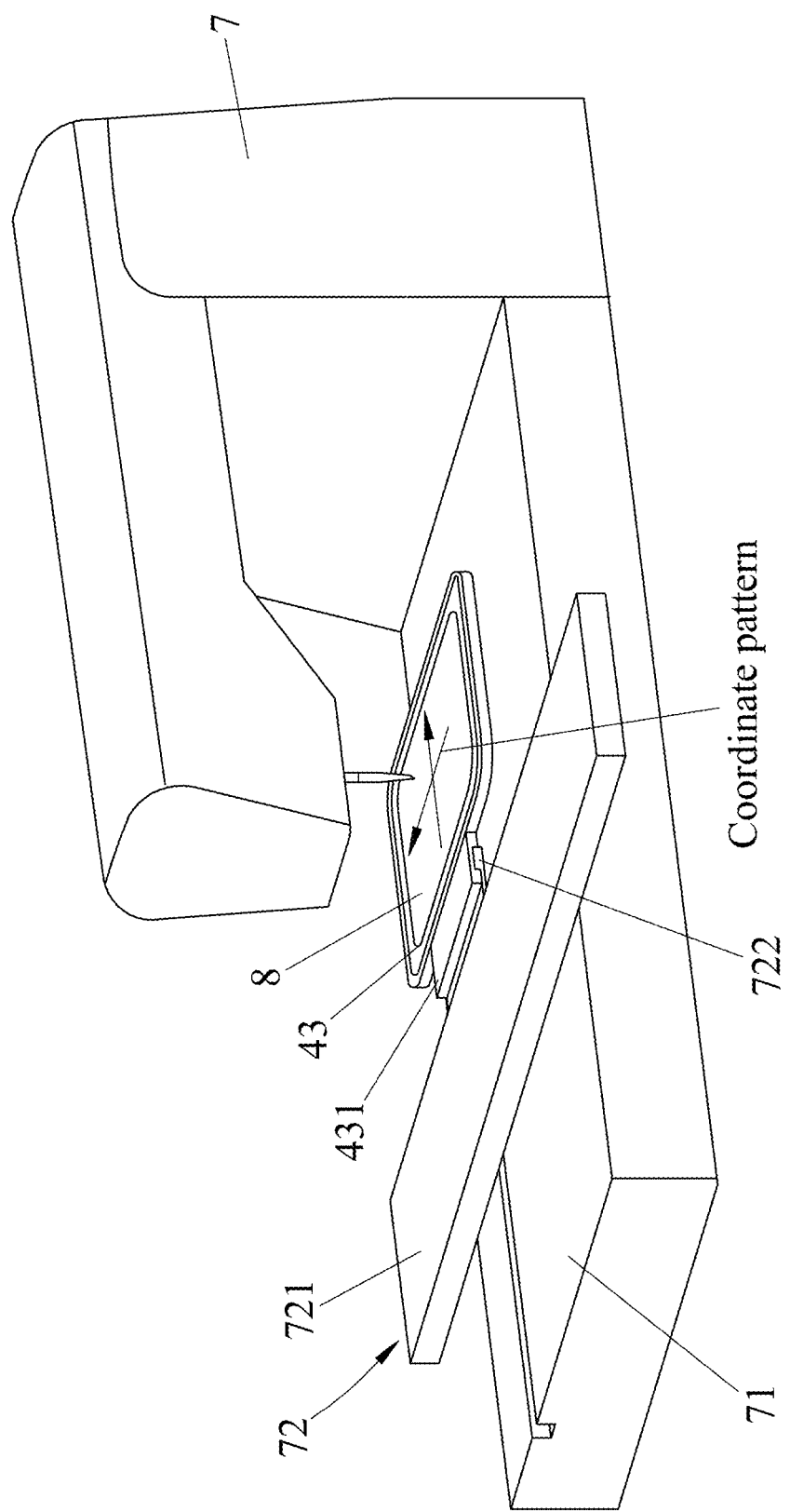
FIG. 8 is a perspective view illustrating a coordinate pattern that represents a planar coordinate system and that is sewn on a fabric piece.
Figure 9:
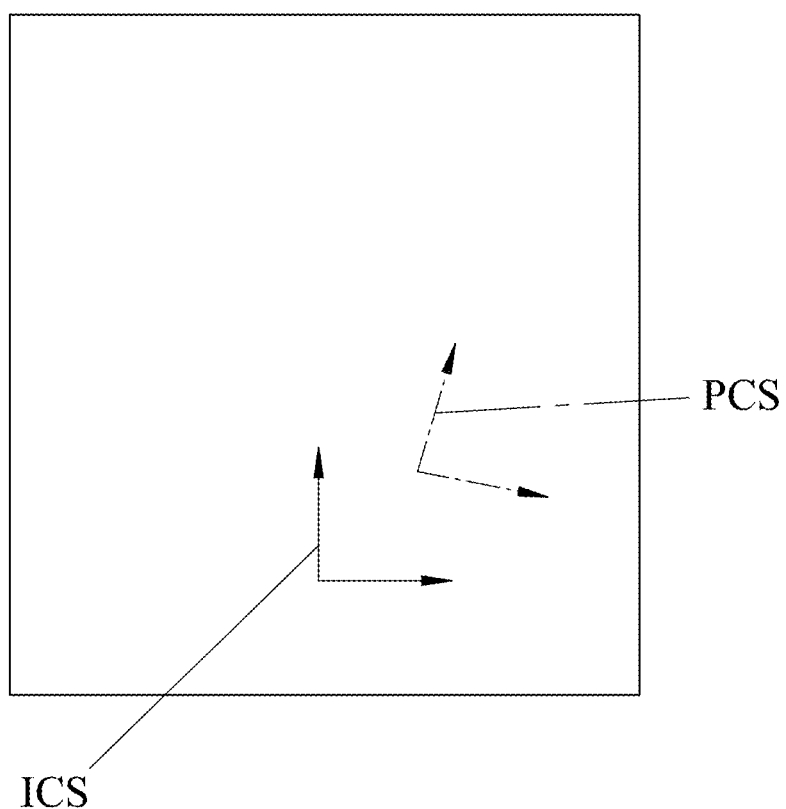
FIG. 9 is a schematic diagram illustrating a difference between the planer coordinate system and an image coordinate system of images captured by the camera box.

In this embodiment, the coordinates of the edge points ($E_2$) in the WCS are calculated by image alignment. Referring to FIGS. 7 and 8, the computerized embroidery machine 7 includes a bed 71 and a moving mechanism 72. The moving mechanism 72 includes a body 721 extending in a y-axis and movable along an x-axis that is transverse to the y-axis, and a connection unit 722 (e.g., one part of a tongue and groove joint) movably mounted to the body 721 and movable along the y-axis on the body 721. After the embroidery frame 43 is engaged with the connection unit 722 via the first engaging structure 431 (which may be another part of the tongue and groove joint), the body 721 and the connection unit 721 cooperate to be capable of bringing the embroidery frame 43 into movement along the x-axis and the y-axis for embroidery. For image alignment, a fabric piece 8 is framed in the embroidery frame 43, and the computerized embroidery machine 7 is operated to embroider a predetermined pattern representative of a planar coordinate system (PCS) that corresponds to the WCS. Particularly, the planar coordinate system is a special case in the world coordinate system where the coordinates in a third axis (not shown) that is orthogonal to the x-axis and the y-axis are the same. To be representative of the planar coordinate system (PCS), the predetermined pattern may be composed of the x-axis, y-axis, and an origin (0, 0) of the PCS, such as a coordinate/cross pattern as shown in FIG. 8. Then, the embroidery frame 43 that frames the fabric 8 with the predetermined pattern thereon is placed in the camera box 5 to acquire a second image of the fabric 8 with the predetermined pattern, and the computer device may perform image correction on the second image to obtain a corrected second image if necessary. Referring to FIG. 9, since the (corrected) second image uses the ICS to show the coordinate/cross pattern that is embroidered based on the PCS, the computer device may calculate a rotation matrix and a displacement vector of the PCS relative to the ICS based on the (corrected) second image, and acquire an image scale between a size of the predetermined pattern in the (corrected) second image and a size of the predetermined pattern that is embroidered in the real world. A unit for the image scale in this embodiment may be, for example, μm/pixel, mm/pixel, cm/pixel, etc., which represents a length in the real world to which each pixel in the (corrected) first and/or second image corresponds. Since both of the first and second images are captured using the camera box 5, the image scale that is acquired based on the (corrected) second image also corresponds to the (corrected) first image. Then, by making the (corrected) first image and the (corrected) second image coincide with each other, the computer device may convert, for each of the edge points ($E_2$), coordinates in the ICS into the coordinates in the WCS based on the rotation matrix, the displacement vector and the image scale. In one embodiment, the conversion may be performed according to:

$$c_w = \alpha(Ac_i + b),$$

where $c_i$ represents the coordinates of one edge point ($E_2$) in the ICS, $c_w$ represents the coordinates of the edge point ($E_2$) in the WCS that corresponds to $c_i$, A represents the rotation matrix, b represents the displacement vector, and α represents the image scale.

Figure 10:
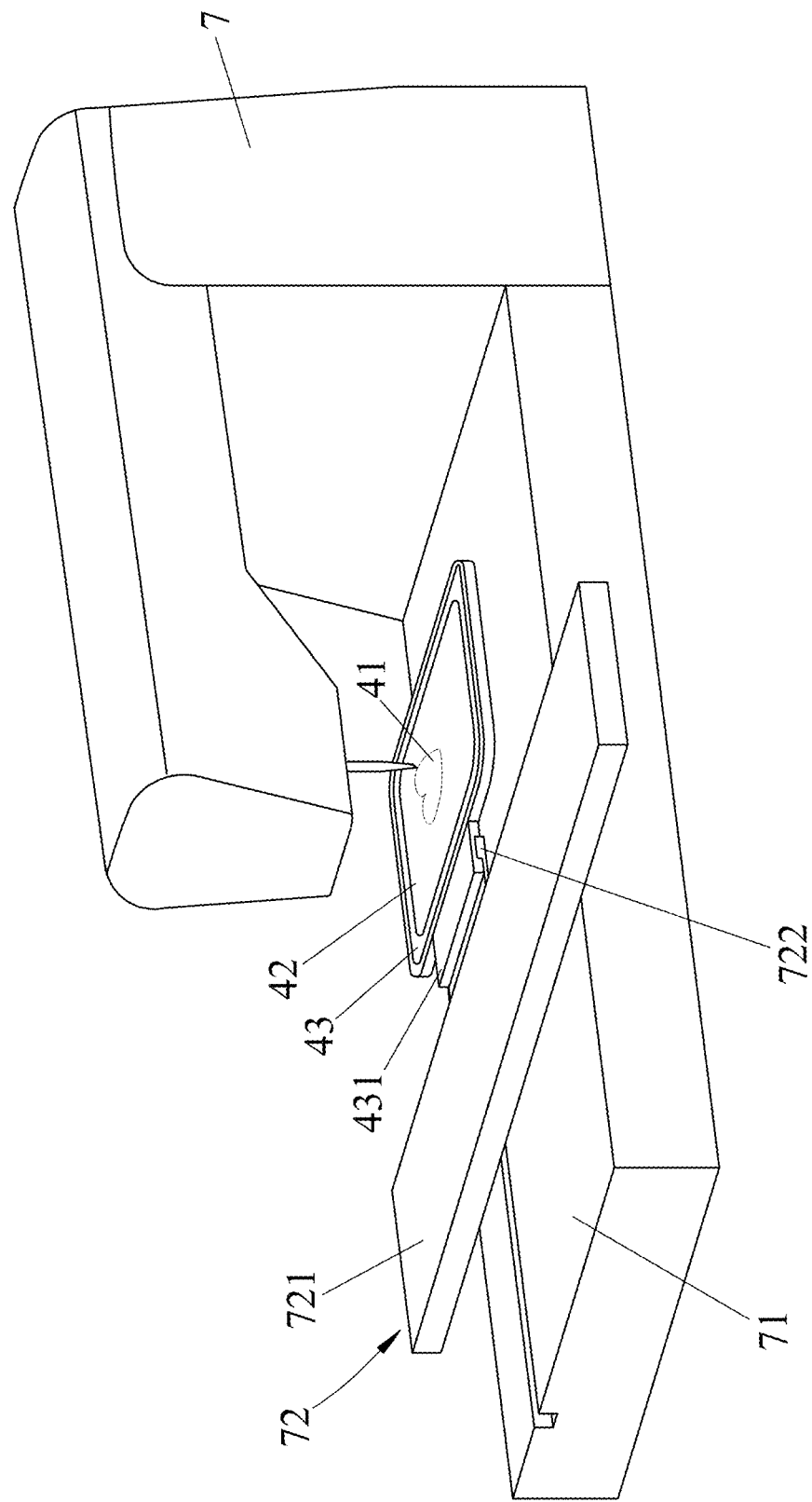
FIG. 10 is a perspective view illustrating embroidery performed along an embroidery path formed by coordinates in a world coordinate system converted from coordinates of the edge points in the image coordinate system.
Figure 11:
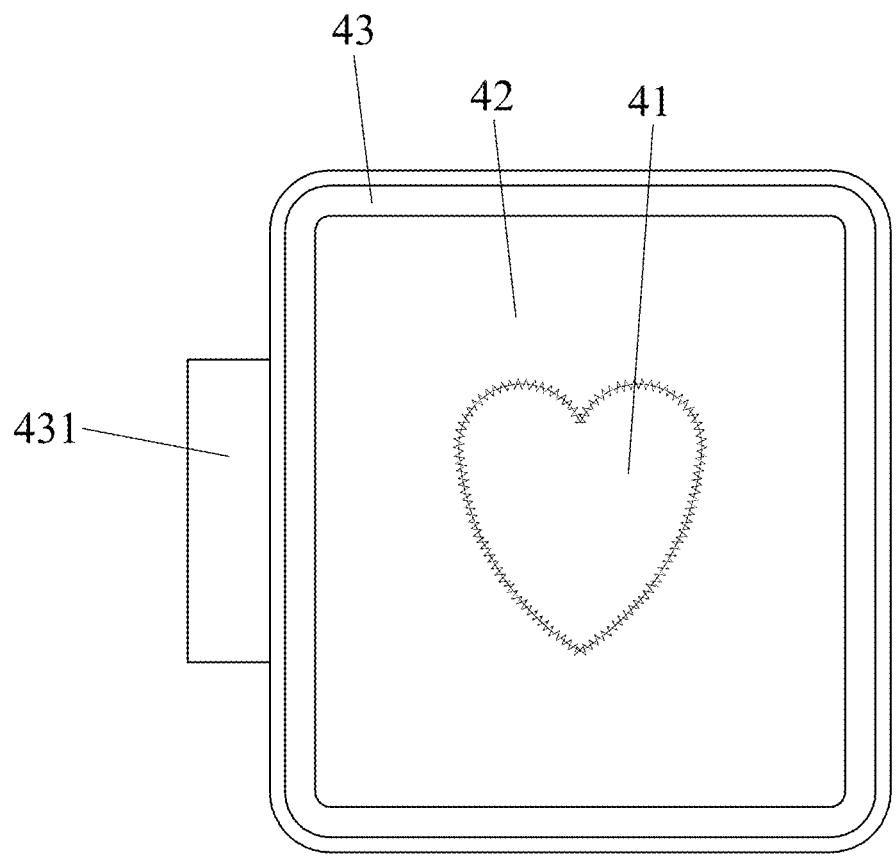
FIG. 11 is a schematic diagram illustrating the appliqué completed in correspondence to FIG. 10.

In step 35, as shown in FIG. 10, the embroidery frame 43 that frames the second fabric piece 42 with the first fabric piece 41 attached thereto is connected to the moving mechanism 72 of the computerized embroidery machine 7, and the computerized embroidery machine 7 is operated to automatically embroider the first fabric piece 41 onto the second fabric piece 42 along an embroidering path formed by the coordinates of the edge points ($E_2$) in the WCS, thereby obtaining an embroidery result as shown in FIG. 11.

Accordingly, the proposed method enables the computerized embroidery machine 7 to automatically perform appliqué using any user-prepared fabric piece, of which a shape of the contour is arbitrary, and is not limited to performing appliqué using only the shape models stored in the computerized embroidery machine 7.

Figure 12:
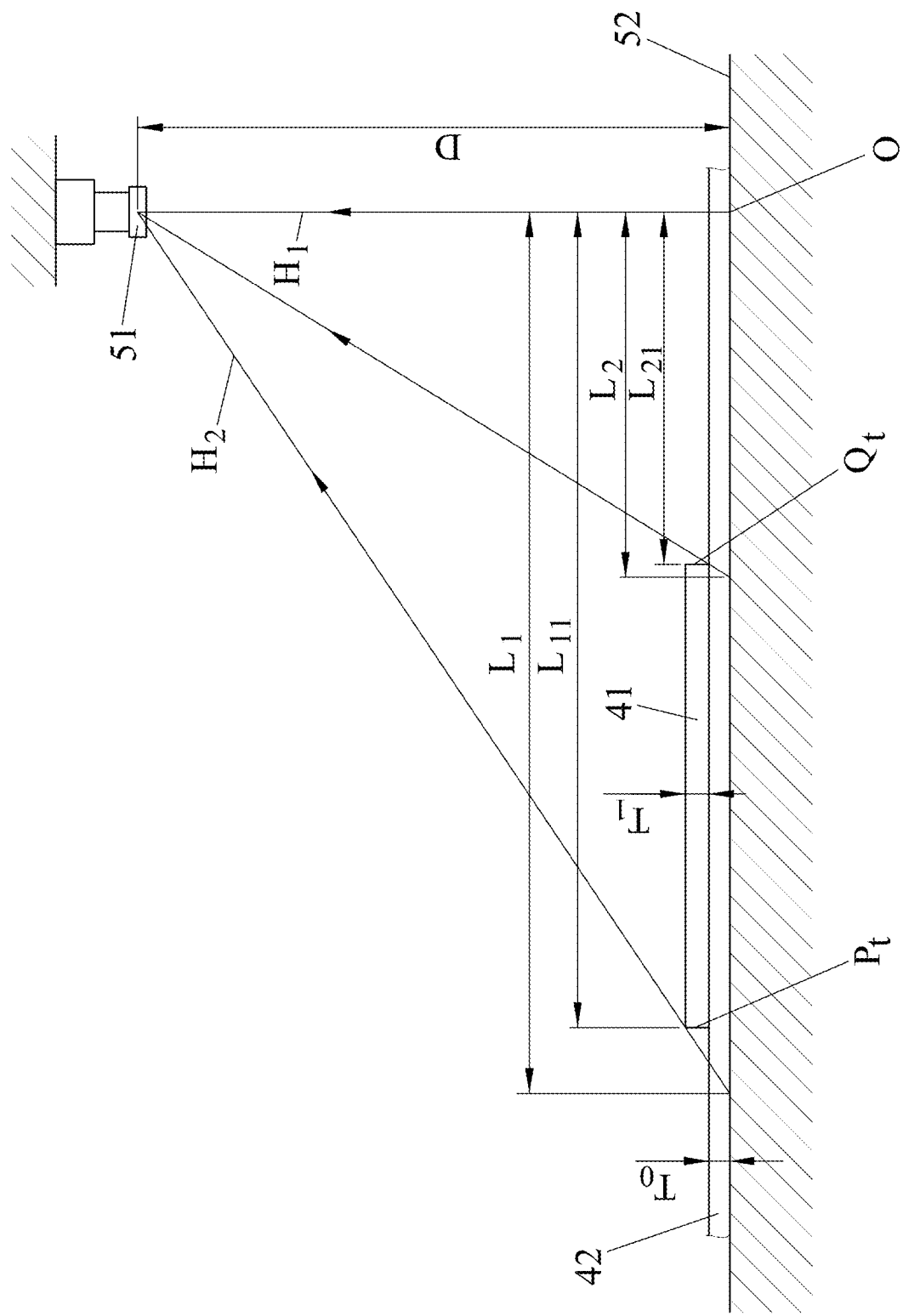
FIG. 12 is a schematic diagram illustrating coordinate correction based on thicknesses of fabric pieces.

In one implementation, when either the first fabric piece 41 or the second fabric piece 42 has a greater thickness, a coordinate correction based on the fabric thickness may be performed on the WCS coordinates of the edge points ($E_2$) between steps 34 and 35. Referring to FIG. 12, a lens 51 of the camera box 5 (see FIG. 4) receives a plurality of light beams coming from various directions. For example, the light beam (H1) comes from a direction that is perpendicular to an imaging plane of the lens 51, while the light beam (H2) comes from a direction that is not perpendicular to the imaging plane of the lens 51. Accordingly, when an edge point ($E_2$) in the (corrected) first image corresponds to an actual position ($P_t$) in the real world, the WCS coordinates of the edge point ($E_2$) calculated in step 34 would have a distance of $L_1$ from a reference axis (e.g., an optical axis of the lens 51) (i.e., a shortest distance between the edge point (E2) and the reference axis is $L_1$) in the real world, which is greater than an actual distance of $L_{11}$ between the position ($P_t$) and the reference axis (i.e., a shortest distance between the position (Pr) and the reference axis is $L_{11}$) in the real world. The computer device calculates a correction distance ($L_1-L_{11}$) according to a property between similar triangles: $L_1-L_{11}=L_1\times(T_0+T_1)/D$, where $T_0$ represents the thickness of the second fabric piece 42, $T_1$ represents the thickness of the first fabric piece 41, and D represents a distance between the lens 51 and a bottom surface 52 of the camera box 5 in the real world. Accordingly, the WCS coordinates of the edge point ($E_2$) corresponding to the position ($P_t$) may be corrected by reducing the distance from the reference axis by the correction distance ($L_1-L_{11}$). Similarly, for another edge point ($E_2$) in the (corrected) first image that corresponds to an actual position ($Q_t$) in the real world as depicted in FIG. 12, a correction distance ($L_2-L_{21}$) is calculated according to the property between similar triangles: $L_2-L_{21}=L_2\times T_0/D$. Accordingly, the WCS coordinates of the edge point ($E_2$) corresponding to the position ($Q_t$) may be corrected by reducing the distance from the reference axis by the correction distance ($L_2-L_{21}$).

In one implementation, the computer device may determine, for each edge point ($E_2$), whether or not to perform the correction on the WCS coordinates thereof. In practice, the computer device may be configured not to perform the correction for an edge point ($E_2$) upon determining that a distance between the edge point ($E_2$) and the reference axis is smaller than a threshold value, and to perform the correction for an edge point ($E_2$) upon determining that the distance between the edge point ($E_2$) and the reference axis is greater than the threshold value.

Figure 13:
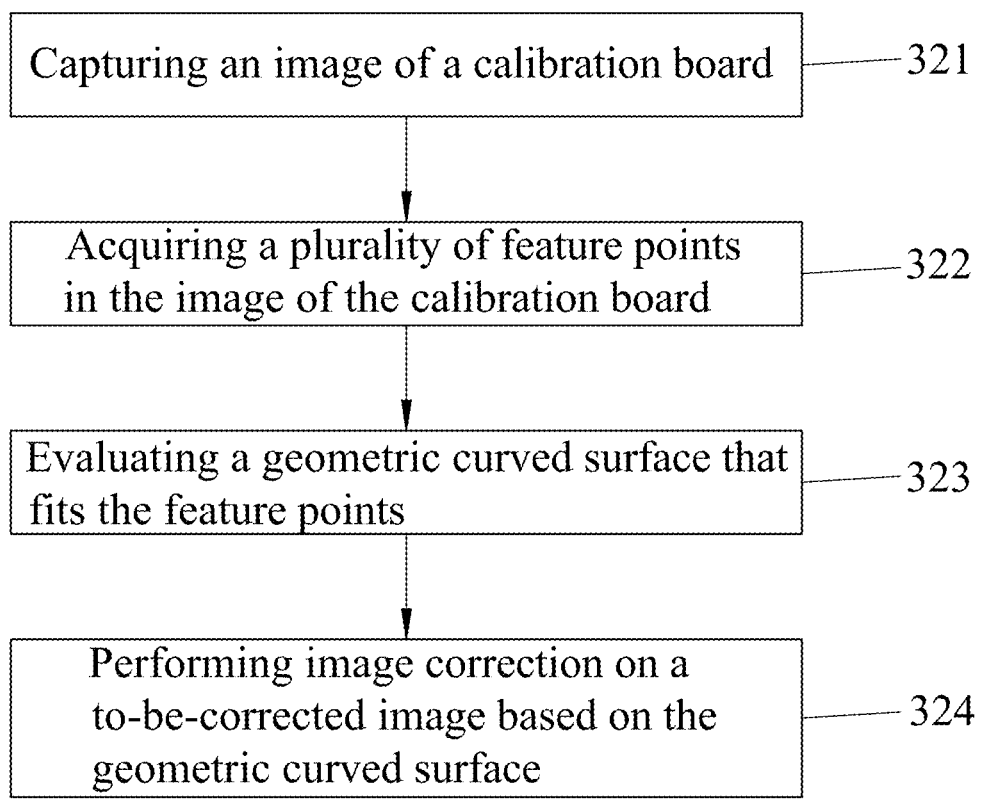
FIG. 13 is a flow chart illustrating steps of an embodiment of image correction according to this disclosure.
Figure 14:
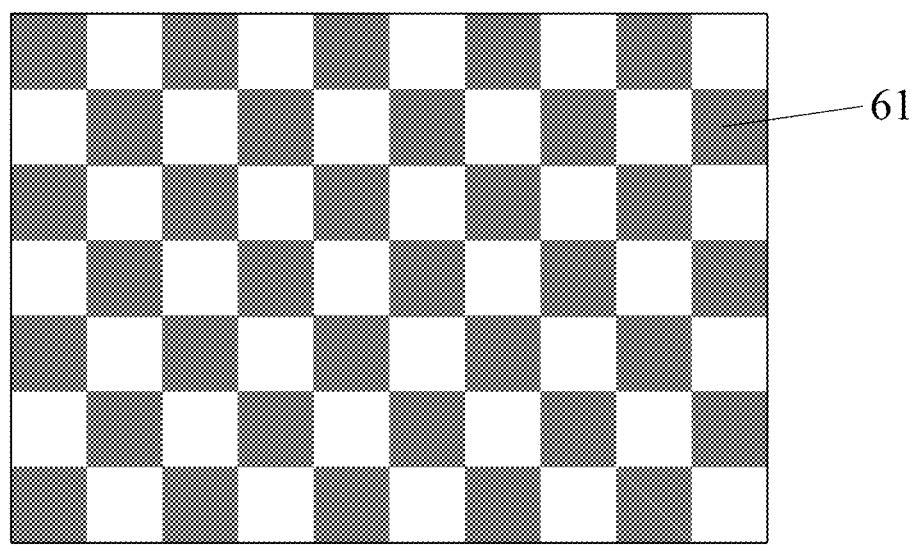
FIG. 14 is a schematic diagram illustrating a calibration board.

In one embodiment, the first image may be corrected in step 32 according to an algorithm as shown in FIG. 13. Further referring to FIG. 14, a calibration board is placed in the camera box 5 for the camera box 5 to capture an image of the calibration board (step 321). In this embodiment, the calibration board is a checkerboard 61, but this disclosure is not limited in this respect.

Figure 15:
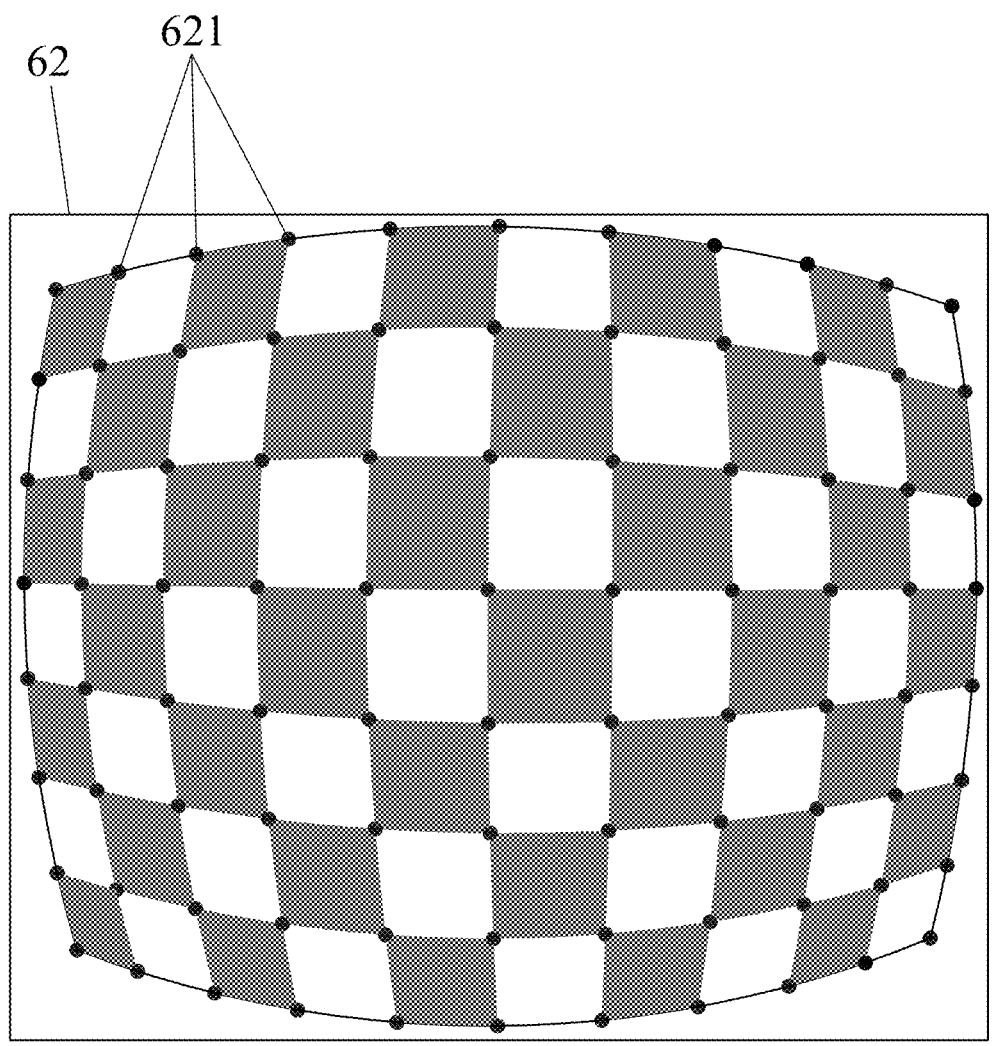
FIG. 15 is a schematic diagram illustrating a plurality of corner points of an image of the calibration board captured by the camera box.
Figure 23:
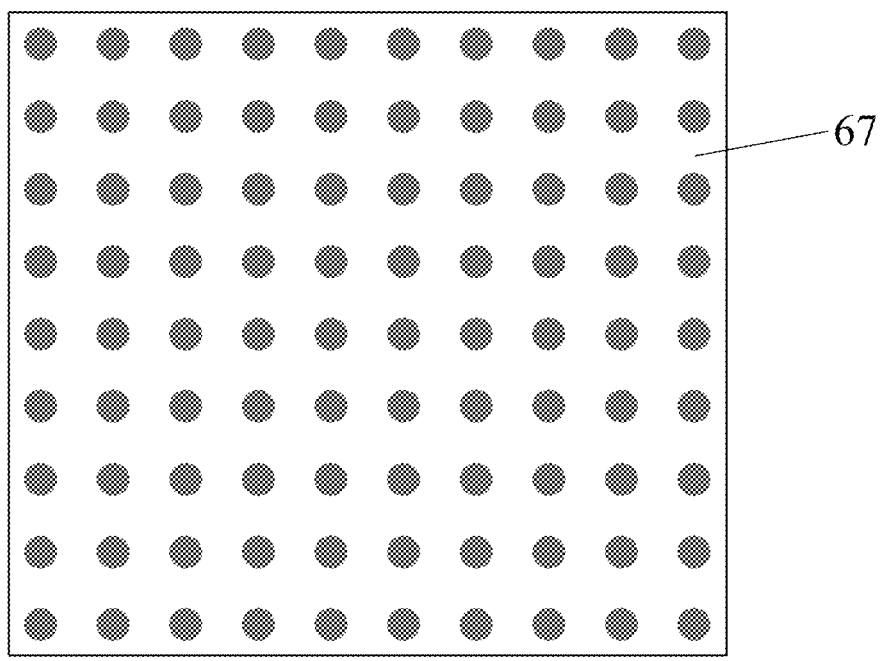
FIG. 23 is a schematic diagram illustrating another type of calibration board.

In step 322, the computer device acquires a plurality of feature points in the image of the calibration board. In one example, as shown in FIG. 15, the computer device uses the Harris corner detection to acquire a plurality of corner points 621 in the image 62 of the calibration board to serve as the feature points in a form of floating points. In other examples, the calibration board may be of other types such as being patterned with regularly spaced dots, as shown in FIG. 23, and the computer device may acquire a center of each dot to serve as the feature points by image recognition techniques.

Figure 16:
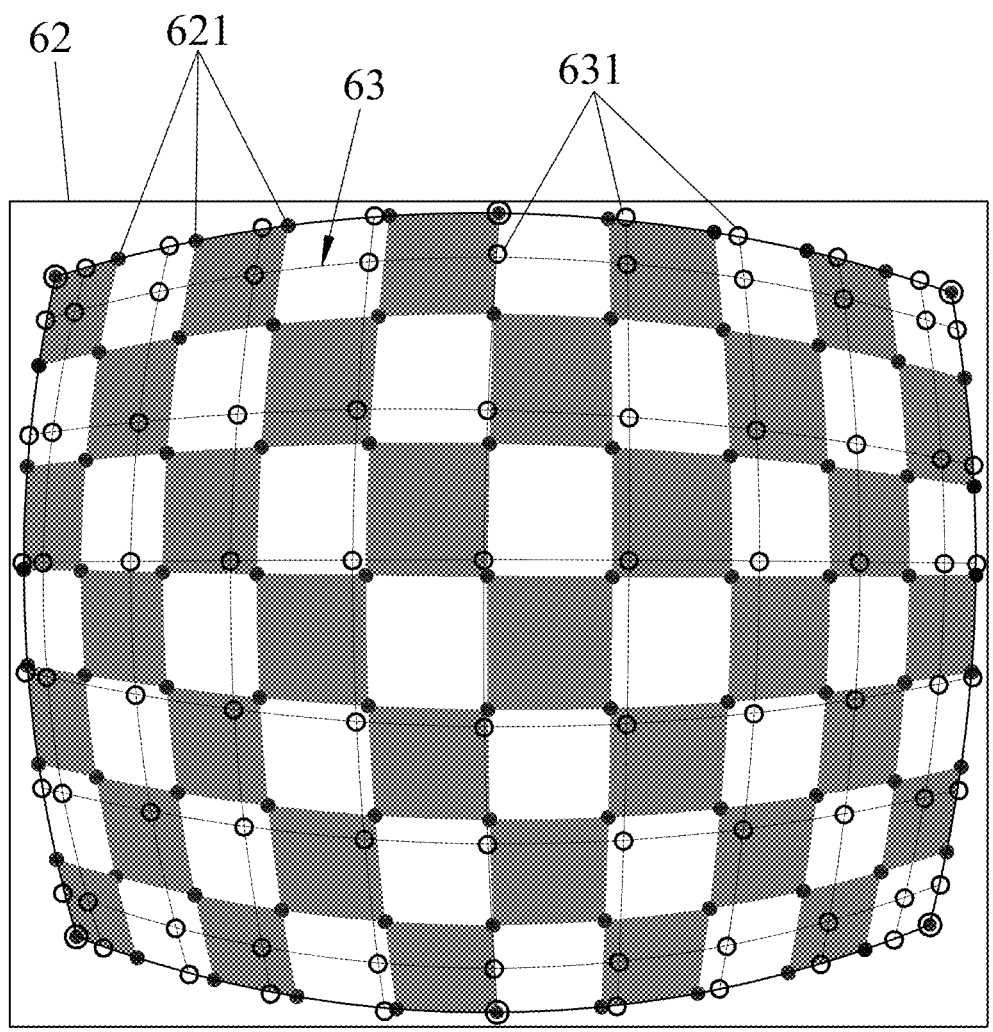
FIG. 16 is a schematic diagram illustrating a parametric non-uniform rational B-splines surface with a plurality of control points thereof, which is evaluated from the corner points.

In step 323, referring to FIG. 16, the computer device calculates/evaluates a plurality of control parameters (i.e., control points 631) that cooperatively define a geometric curved surface which fits the feature points (e.g., the corner points 621). In this embodiment, the geometric curved surface is a parametric NURBS surface 63, which is obtain by parametric NURBS surface interpolation where the feature points are used as interpolation points for evaluating the parametric NURBS surface 63 that fits the feature points and that is defined by:

$$S(u,v) = \frac{\sum_{i=0}^{m}\sum_{j=0}^{n} w_{i,j} P_{i,j} N_{i,p}(u) N_{j,q}(v)}{\sum_{i=0}^{m}\sum_{j=0}^{n} w_{i,j} N_{i,p}(u) N_{j,q}(v)},$$

where S(u,v) represents the parametric NURBS surface 63 defined by (m+1)×(n+1) control parameters (control points 631), m and n are user-defined positive integers, $\{w_{i,j}\}$ represents a set of weighted values, $\{P_{i,j}\}$ represents a set of the control points 631 that are calculated using the feature points 621, $N_{i,p}(u)$ represents a normalized B-spline basis function defined on non-periodic knot vectors U={0, 0, . . . , 0, $u_{p+1}$, . . . , $u_m$, 1, 1, . . . , 1}, $N_{j,q}(v)$ represents a normalized B-spline basis function defined on non-periodic knot vectors V={0, 0, . . . , 0, $v_{q+1}$, . . . , $v_n$, 1, 1, . . . , 1}, p represents a degree in a direction of the knot vectors U (i.e., an axial direction of a u-axis of a domain of the parametric NURBS surface), and q represents a degree in a direction of the knot vectors V (i.e., an axial direction of a v-axis of the domain of the parametric NURBS surface). Note that u belongs to [0, 1] and v belongs to [0, 1].

In step 324, the computer device uses the parametric NURBS surface 63 to perform image correction on a to-be-corrected image (e.g., the first image) so as to generate a corrected image (e.g., the corrected first image). The image 62 of the checkerboard 61 (see FIG. 14) shown in FIG. 15 is used as the to-be-corrected image 69 (see FIG. 19) for illustration hereinafter.

Figure 17:
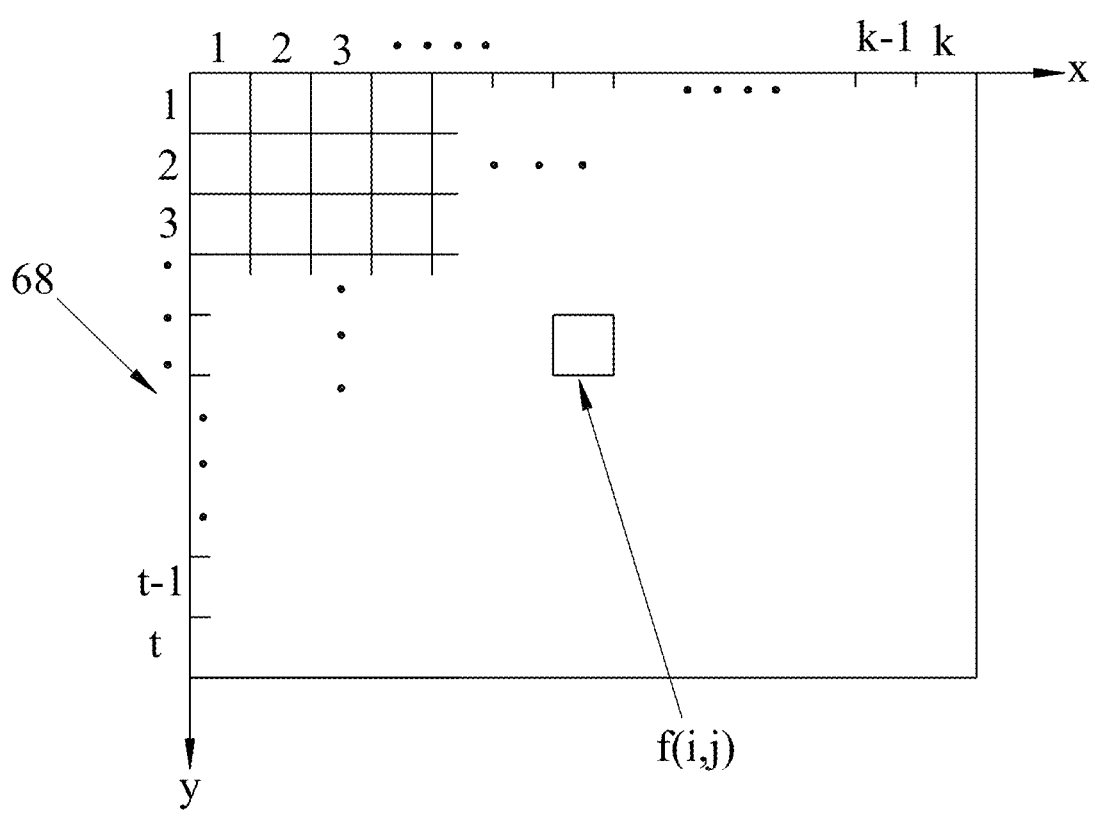
FIG. 17 is a schematic diagram illustrating defining a number of pixels of a corrected image.

Referring to FIG. 17, for the corrected image 68, a first pixel number (k) along a first image axis (e.g., the x-axis) of the corrected image 68, and a second pixel number (t) along a second image axis that is transverse to the first image axis (e.g., the y-axis) of the corrected image 68 are defined first. In other words, a size/resolution of the corrected image 68 can be set/defined as desired by use of this correction algorithm.

Figure 18:
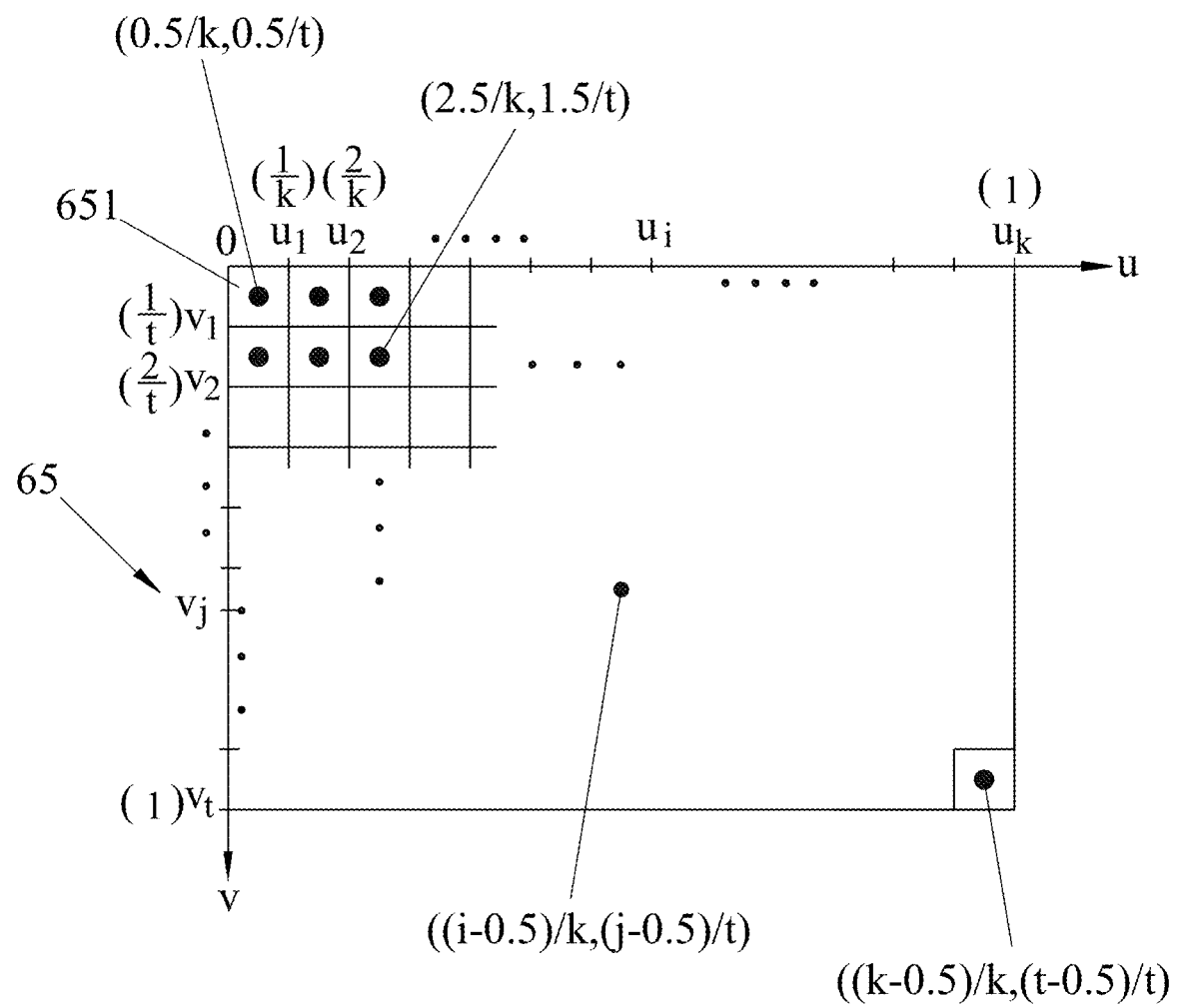
FIG. 18 is a schematic diagram illustrating a domain of the parametric non-uniform rational B-splines surface.
Figure 19:
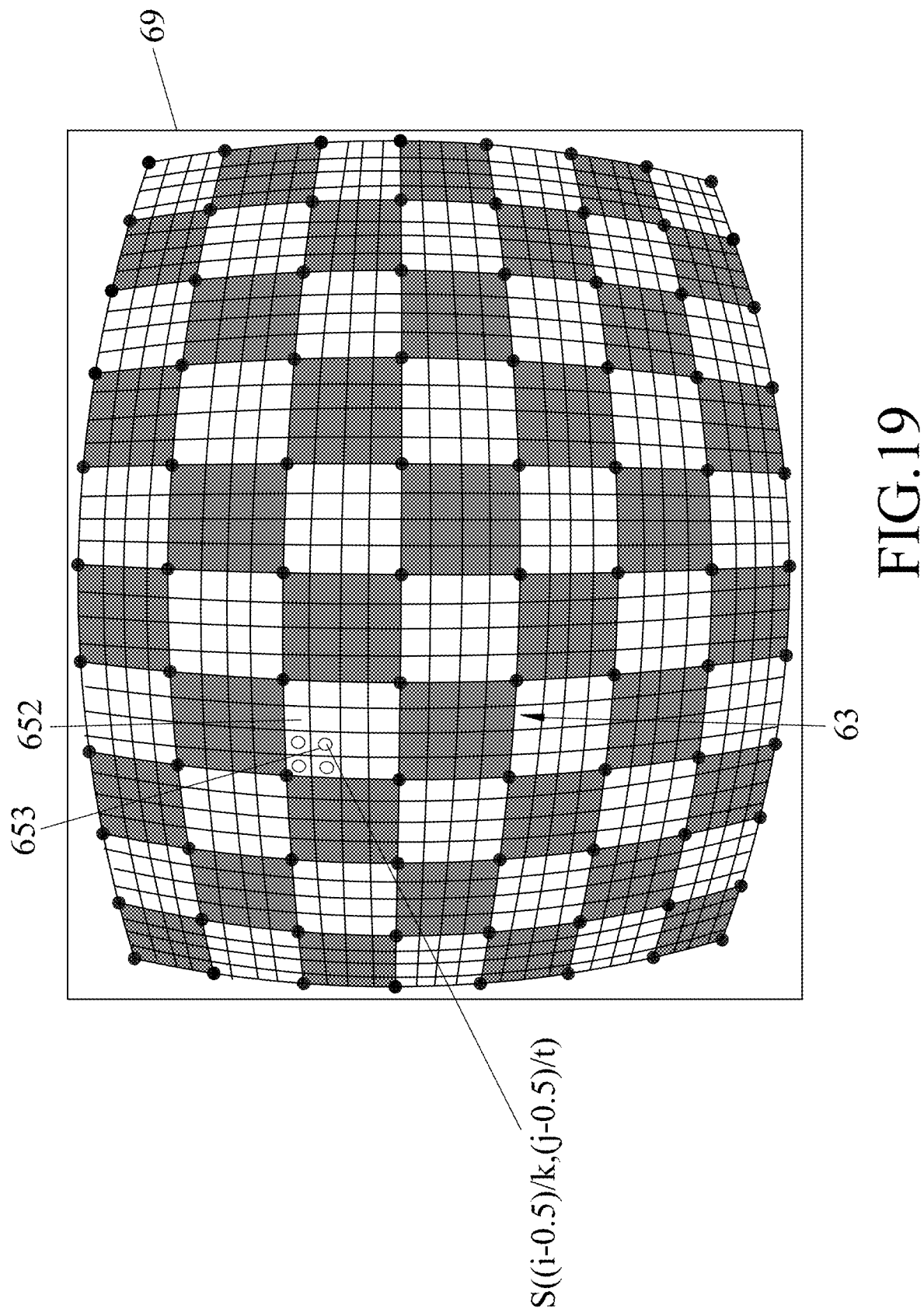
FIG. 19 is a schematic diagram cooperating with FIGS. 17 and 18 to illustrate acquiring pixel values of the pixels of the corrected image.

Referring to FIGS. 18 and 19, the first pixel number (k) of first sample points $\{u_i | i=1, 2, \ldots, k\}$, and the second pixel number (t) of second sample points $\{v_j | j=1, 2, \ldots, t\}$ are defined respectively on the u-axis and the v-axis in the domain 65 of the parametric NURBS surface 63 (see FIG. 16). The first and second sample points cooperatively define, on the parametric NURBS surface 63, a plurality of curved surface points (the black dots in FIG. 18) each corresponding to a respective one of pixels of the corrected image 68. In this embodiment, the first sample points divide the range equally between 0 and 1 on the u-axis, i.e., a distance between any two adjacent first sampling points is 1/k; the second sample points divide the range equally between 0 and 1 on the v-axis, i.e., a distance between any two adjacent second sampling points is 1/t; and coordinates $(u_i,v_j)$ in the domain 65 correspond to a curved surface point S $((i-0.5)/k, (j-0.5)/t)$ on the parametric NURBS surface 63. In other words, if f(i,j) is used to represent a $(i,j)^{th}$ pixel of the corrected image 68 (a pixel at the $i^{th}$ column and the $j^{th}$ row of a pixel array of the corrected image 68), f(i,j) corresponds to $(u_i,v_j)$ and the curved surface point S $((i-0.5)/k, (j-0.5)/t)$, where i is a positive integer between 1 and k (including 1 and k), and j is a positive integer between 1 and t (including 1 and t). As shown in FIG. 18, the domain 65 is divided into a plurality of identical rectangular or square boxes 651 of which a number is the same as a total number of the pixels in the corrected image 68. Each box 651 corresponds to a respective one of the pixels of the corrected image 68, and has a central point that corresponds to a respective one of the curved surface points on the parametric NURBS surface 63. Accordingly, each pixel of the corrected image 68 corresponds to a respective one of the curved surface points that corresponds to the central point of the corresponding box 651. Further referring to FIG. 19, each box 651 in the domain 65 corresponds to a polygon region 652 of the parametric NURBS surface 63, and each polygon region 652 contains a curved surface point 653 that corresponds to a pixel of the corrected image 68.

Then, a pixel value of the pixel f(i,j) of the corrected image 68 may be calculated by performing interpolation (e.g., nearest neighbor interpolation, bilinear interpolation, etc.) based on at least a pixel of the to-be-corrected image 69 that is adjacent to a position corresponding to one of the curved surface points 653 which corresponds to the pixel f(i,j) (the position on the to-be-corrected image 69 that is aligned with the corresponding curved surface point 653 when the parametric NURBS surface 63 coincides the calibration board (e.g., checkerboard 61 in this example) in the to-be-corrected image 69). For instance, in FIG. 19, the parametric NURBS surface 63 coincides the calibration board in the to-be-corrected image 69, and the pixel value of a pixel f(5,6) of the corrected image 68 can be calculated based on at least one pixel of the to-be-corrected image 69 that is adjacent to a curved surface point 653 S(4.5/k, 5.5/t) (see FIG. 18) in correspondence to the coordinates (u5, v6) in the domain 65 of the parametric NURBS surface 63.

Figure 20:
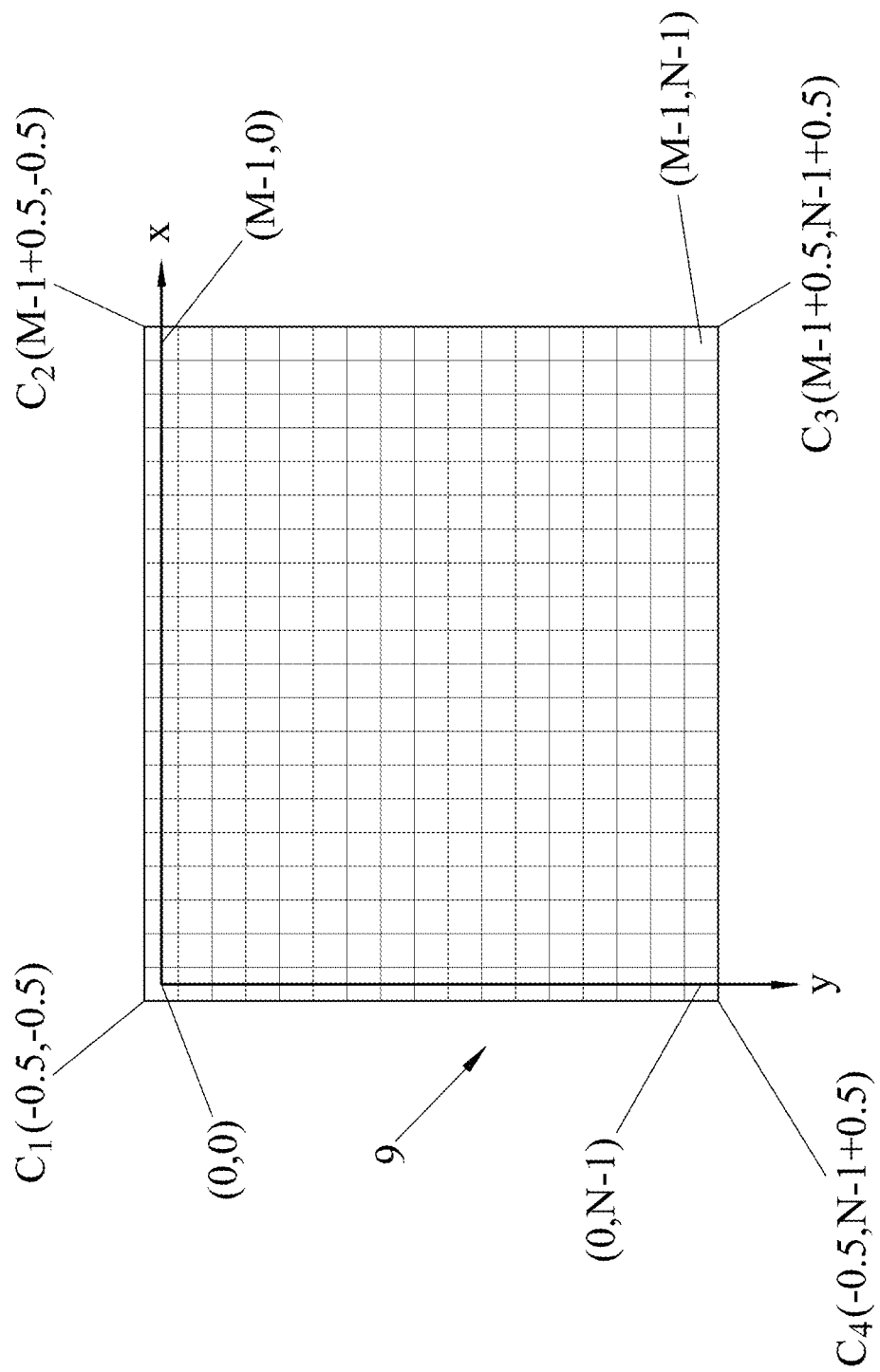
FIG. 20 is a schematic diagram illustrating a coordinate plane that is required to be covered by an image coordinate system corresponding to a to-be-corrected image.

Referring to FIG. 20, since each curved surface point is represented as a floating point, an image coordinate system that corresponds to the to-be-corrected image 69 should cover a coordinate plane 9 defined by four terminal points: $C_1(-0.5, -0.5)$, $C_2(M-1+0.5, -0.5)$, $C_3(M-1+0.5, N-1+0.5)$ and $C_4(-0.5, N-1+0.5)$ when the to-be-corrected image 69 has a number (M×N) of pixels, so as to cover the curved surface points disposed at borders of the parametric NURBS surface. The pixel of the to-be-corrected image has a central point of which the coordinates are (i−1,j−1) in the image coordinate system, where i is a positive integer between 1 and M (including 1 and M), and j is a positive integer between 1 and N (including 1 and N).

Figure 21:
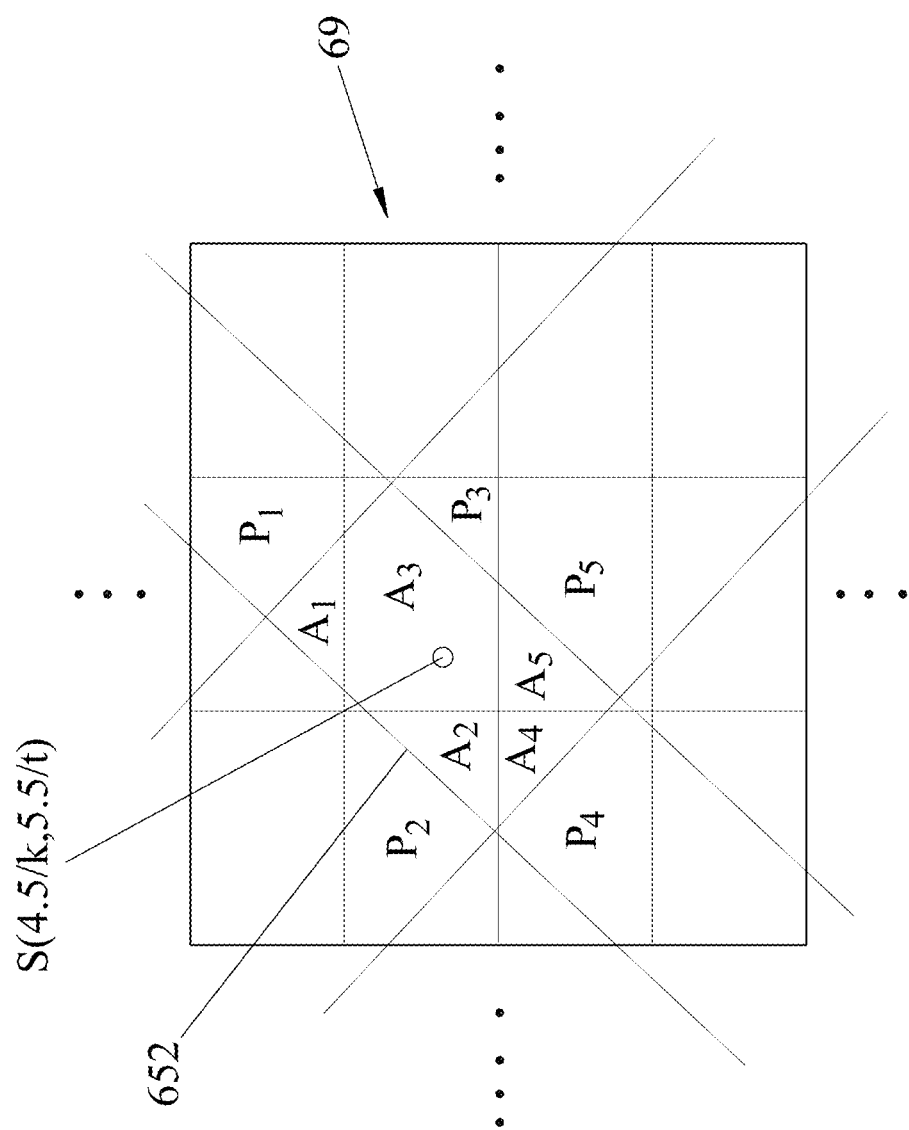
FIG. 21 is a schematic diagram illustrating another implementation for calculating the pixel values of the pixels of the corrected image.

Referring to FIG. 21, in another implementation, the pixel value of the pixel f(i,j) (e.g., f(5,6)) of the corrected image 68 may be calculated by performing interpolation based on a weighted mean of the pixels of the to-be-corrected image 69 overlapping the polygon region 652 of the parametric NURBS surface 63 which contains the point $((i-0.5)/k, (j-0.5)/t)$ (e.g., the point S(4.5/k, 5.5/t) in FIG. 21). Each pixel of the to-be-corrected image 69 has a weight being a ratio of an area of the pixel that overlaps the polygon region 652. For instance, in FIG. 21, the polygon area 652 overlaps the pixels $P_1$ to $P_5$ of the to-be-corrected image 69 by areas of $A_1$, $A_2$, $A_3$, $A_4$ and $A_5$, respectively. Making $$V = \sum_{i=1}^{5} A_i,$$

the weighted mean can be represented by $$\sum_{i=1}^{5}\left(\frac{A_i}{V} \times p_i\right),$$

where $p_i$ represents a pixel value of the pixel $P_i$ of the to-be-corrected image 69, and $A_i/V$ is the weight for the pixel $P_i$. In yet another implementation, the weight for the pixel $P_i$ of the to-be-corrected image 69 may be defined based on a distance between a center of the pixel Pi o and the point $((i-0.5)/k, (j-0.5)/t)$ in the to-be-corrected image 69, where the shorter the distance, the greater the weight.

Figure 22:
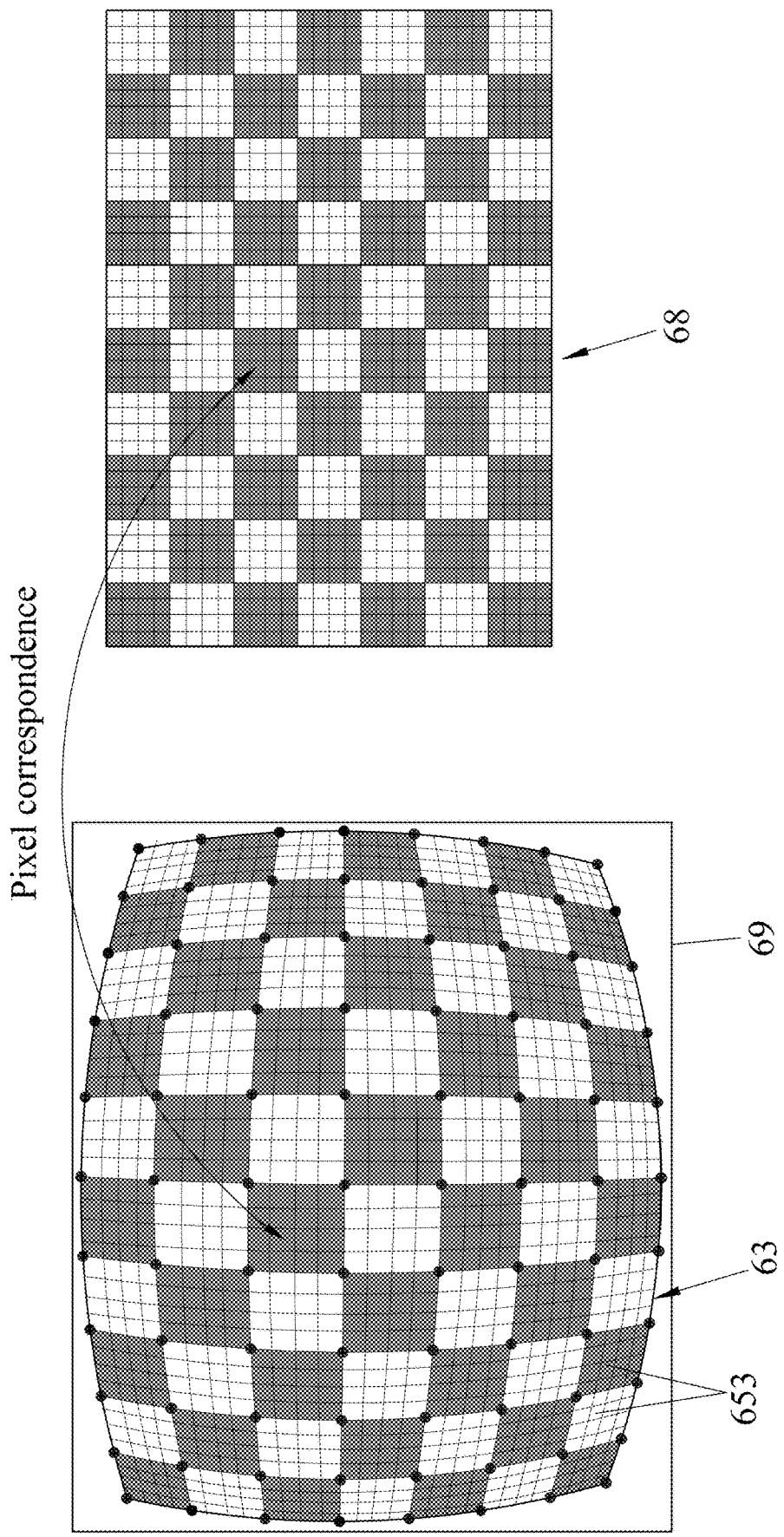
FIG. 22 is a schematic diagram exemplarily illustrating a corrected image of a to-be-corrected image which is an image of the calibration board.

By virtue of the curved surface points 653, any image that is captured using the camera box 5 can be corrected, including the aforementioned first image and second image. FIG. 22 illustrate a corrected image 68 that is acquired by performing the abovementioned image correction on the image 69 which is captured using the camera box 5.

Since the aforementioned image correction algorithm is based on a captured result of a camera apparatus, distortions resulting from, for instance, geometric design of the camera lens, lens deformation during manufacturing, imprecision of lens assembly, and/or imprecision of placement of the image sensor, can all be alleviated or corrected by the image correction algorithm. In addition, deformation in the image, which results from the captured object itself (for example, a to-be-captured fabric piece is placed on a curved surface), can also be flattened by use of such image correction algorithm.

Alternatively, the computer device may perform image correction on the first/second image using other algorithms, such as a conventional pinhole camera model, so as to generate the corrected first/second image.

Figure 24:
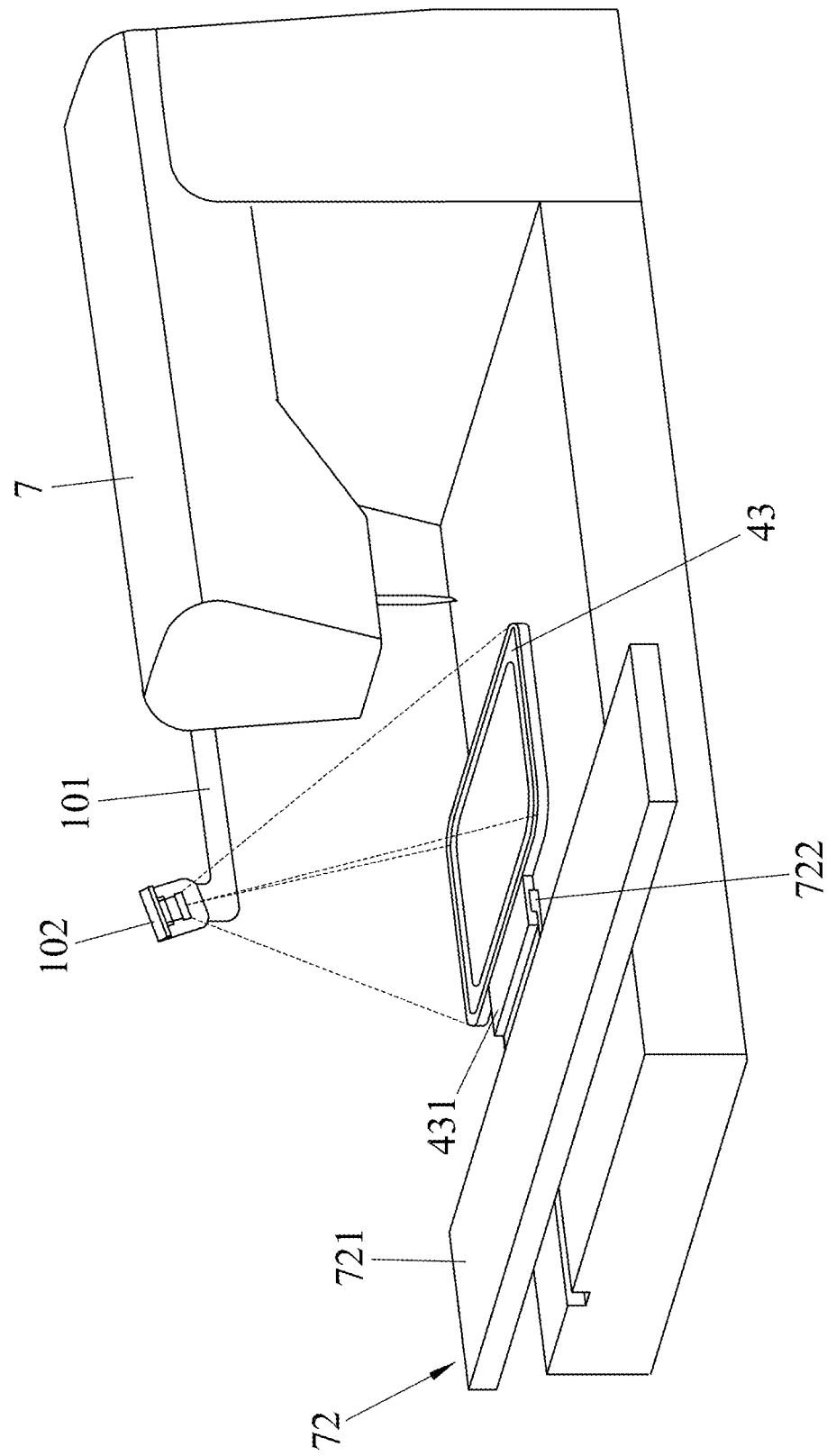
FIG. 24 is a perspective view illustrating another way of capturing images for implementing the method of this disclosure.

It is noted that the image capturing (e.g., the capturing of the first image, the second image, the to-be-corrected image, etc.) in this disclosure is not limited to being performed using the camera box 5. In other embodiments, as shown in FIG. 24, the image capturing may be implemented by installing a bracket 101 on the computerized embroidery machine 7, and mounting a camera 102 to the bracket 101 for capturing images of, for example, a fabric piece framed in the embroidery frame 43.

In summary, the appliqué method of this disclosure is proposed to capture an image of the to-be-sewn fabric piece, to acquire edge points of the to-be-sewn fabric piece in the captured image, and to calculate the WCS coordinates of the edge points by image alignment and/or coordinate correction, so that the computerized embroidery machine can automatically perform embroidery to sew the to-be-sewn fabric piece onto a base fabric piece along an embroidery path formed by the (corrected) WCS coordinates of the edge points.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of sewing a first fabric piece onto a second fabric piece which is larger than the first fabric piece, said method being implemented by a computerized embroidery system and comprising:
   acquiring, by a camera apparatus of the computerized embroidery system, a first image of the first fabric piece, the first image corresponding to a first coordinate system, the computerized embroidery system including a computerized embroidery machine which has a second coordinate system;
   performing, by a computer device of the computerized embroidery system, edge detection on the first image to acquire a plurality of edge points of the first fabric piece in the first image;
   calculating for each of the edge points, by the computer device, coordinates of the edge point in the second coordinate system based on the first and second coordinate systems; and
   embroidering, by the computerized embroidery machine, the first fabric piece onto the second fabric piece along an embroidering path formed by the coordinates of the edge points in the second coordinate system;
   wherein the performing the edge detection includes:
      acquiring a plurality of detected points at an edge of the first fabric piece in the first image based on an edge detection algorithm; and
      performing a smoothing operation on the detected points to acquire the edge points; and
   wherein the performing a smoothing operation includes:
      acquiring a parametric non-uniform rational B-splines curve that fits the detected points; and
      sampling the parametric non-uniform rational B-splines curve to obtain the edge points.

2. The method of claim 1, wherein the calculating the coordinates for each of the edge points includes:
   embroidering onto an object, by the computerized embroidery apparatus, a predetermined pattern representative of a planar coordinate system that corresponds to the second coordinate system;
   acquiring, by the camera apparatus, a second image of the predetermined pattern;
   calculating, by the computer device, a rotation matrix and a displacement vector of the planar coordinate system relative to the first coordinate system based on the second image; and
   converting for each of the edge points, by the computer device, coordinates in the first coordinate system into the coordinates in the second coordinate system based on the rotation matrix, the displacement vector, and an image scale corresponding to the first and second images.

3. A method of sewing a first fabric piece onto a second fabric piece which is larger than the first fabric piece, said method being implemented by a computerized embroidery system and comprising:
   acquiring, by a camera apparatus of the computerized embroidery system, a first image of the first fabric piece, the first image corresponding to a first coordinate system, the computerized embroidery system including a computerized embroidery machine which has a second coordinate system;
   performing, by a computer device of the computerized embroidery system, edge detection on the first image to acquire a plurality of edge points of the first fabric piece in the first image;
   calculating for each of the edge points, by the computer device, coordinates of the edge point in the second coordinate system based on the first and second coordinate systems;
   embroidering, by the computerized embroidery machine, the first fabric piece onto the second fabric piece along an embroidering path formed by the coordinates of the edge points in the second coordinate system; and
   after the calculating the coordinates for each of the edge points and before the embroidering the first fabric piece onto the second fabric piece, performing for at least one of the edge points, by the computer device, correction on the coordinates of the at least one of the edge points by reducing a distance between the at least one of the edge points and a reference axis of the second coordinate system based on a thickness of the first fabric piece and a thickness of the second fabric piece.

4. The method of claim 3, wherein the distance between the at least one of the edge points and the reference axis of the second coordinate system is reduced by a value that is positively correlated to at least one of the thicknesses of the first and second fabric pieces.

5. A method of sewing a first fabric piece onto a second fabric piece which is larger than the first fabric piece, said method being implemented by a computerized embroidery system and comprising:
   acquiring, by a camera apparatus of the computerized embroidery system, a first image of the first fabric piece, the first image corresponding to a first coordinate system, the computerized embroidery system including a computerized embroidery machine which has a second coordinate system;
   performing, by a computer device of the computerized embroidery system, edge detection on the first image to acquire a plurality of edge points of the first fabric piece in the first image;
   calculating for each of the edge points, by the computer device, coordinates of the edge point in the second coordinate system based on the first and second coordinate systems;
   embroidering, by the computerized embroidery machine, the first fabric piece onto the second fabric piece along an embroidering path formed by the coordinates of the edge points in the second coordinate system; and after the acquiring the first image and before the performing the edge detection, performing image correction on the first image;

wherein the performing the image correction includes:
  acquiring an image of a calibration board;
  acquiring a plurality of feature points in the image of the calibration board;
  evaluating a plurality of control parameters based on the feature points, the control parameters cooperatively defining a geometric curved surface that fits the feature points; and
  generating a corrected first image that contains the edge points based on the first image and the geometric curved surface.

6. The method of claim 5, wherein the geometric curved surface is a parametric non-uniform rational B-splines surface.

7. The method of claim 6, wherein the generating the corrected first image includes:
  defining, for the corrected first image that has a first image axis and a second image axis transverse to the first image axis, a first pixel number along the first image axis, and a second pixel number along the second image axis, the corrected first image having a plurality of pixels of which a number relates to the first pixel number and the second pixel number;
  defining, in a domain of the geometric curved surface, the first pixel number of first sample points on a first domain axis, and the second pixel number of second sample points on a second domain axis that is transverse to the first domain axis, the first sample points and the second sample points cooperatively defining, on the geometric curved surface, a plurality of curved surface points each corresponding to a respective one of the pixels of the corrected first image; and
  generating the corrected first image based on the curved surface points and the first image.

8. The method of claim 7, wherein the first image includes a plurality of first image pixels, the generating the corrected first image further includes:
  calculating, for each of the pixels of the corrected first image, a pixel value based on at least one of the first image pixels that is adjacent to a position corresponding to one of the curved surface points which corresponds to the pixel of the corrected first image.

9. The method of claim 8, wherein, for each of the pixels of the corrected first image, the pixel value thereof is calculated by performing interpolation based on said at least one of the first image pixels.

10. The method of claim 8, wherein, for each of the pixels of the corrected first image, the pixel value thereof is calculated by calculating a weighted mean based on said at least one of the first image pixels.

11. The method of claim 7, wherein any adjacent two of the first sample points has a same distance therebetween on the first domain axis, and any adjacent two of the second sample points has a same distance therebetween on the second domain axis.

* * * * *